(12) United States Patent
Takahama et al.

(10) Patent No.: US 7,532,109 B2
(45) Date of Patent: May 12, 2009

(54) VEHICLE OBSTACLE VERIFICATION SYSTEM

(75) Inventors: Taku Takahama, Yokohama (JP);
Takeshi Kimura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 314 days.

(21) Appl. No.: 11/490,085

(22) Filed: Jul. 21, 2006

(65) Prior Publication Data

US 2007/0030131 A1   Feb. 8, 2007

(30) Foreign Application Priority Data

Aug. 2, 2005   (JP)   ............................. 2005-224335

(51) Int. Cl.
*B60Q 1/00*   (2006.01)
(52) U.S. Cl. ...................... 340/436; 340/435; 340/437; 701/1
(58) Field of Classification Search .................. 340/436
See application file for complete search history.

(56) References Cited

U.S. PATENT DOCUMENTS

| 4,679,077 | A | * | 7/1987 | Yuasa et al. ................. 348/154 |
| 5,467,283 | A | * | 11/1995 | Butsuen et al. ............. 701/301 |
| 6,882,303 | B2 | * | 4/2005 | Samukawa et al. ............ 342/70 |

| 2003/0201878 | A1 | * | 10/2003 | Bai et al. ..................... 340/435 |
| 2003/0227378 | A1 | * | 12/2003 | Nakai et al. ................. 340/435 |
| 2003/0236605 | A1 | * | 12/2003 | Takahashi ..................... 701/45 |
| 2004/0122573 | A1 | * | 6/2004 | Mizutani ..................... 701/45 |
| 2005/0114000 | A1 | * | 5/2005 | Cashler ....................... 701/45 |

FOREIGN PATENT DOCUMENTS

| JP | 2003-16599 | 1/2003 |
| JP | 2003-72415 | 3/2003 |
| JP | 2004-27513 | 9/2004 |

* cited by examiner

*Primary Examiner*—Toan N Pham
*Assistant Examiner*—Kerri L McNally
(74) *Attorney, Agent, or Firm*—Global IP Counselors, LLP

(57) ABSTRACT

A vehicle obstacle verification system and method is provided to improve the precision in which preceding objects are identified as being a potential obstacle to a host vehicle. The obstacle verification system (1, 2) uses at least two verification methods to make preliminary determinations as to whether a preceding object will become an obstacle in the future. The obstacle verification system (1, 2) also determines the precision of the verification results obtained with each of the verification methods. Additionally, the obstacle verification system (1, 2) calculates a verification result obtained using a verification method tailored to the traveling scene, the calculation being based on the verification results obtained using the plurality of verification methods, and makes a final determination as to whether the preceding object will become an obstacle based on the calculated verification result and the previously determined precisions.

27 Claims, 12 Drawing Sheets

VEHICLE OBSTACLE VERIFICATION SYSTEM

CROSS-REFERENCE TO RELATED APPLICATIONS

This application claims priority under 35 U.S.C. § 119 to Japanese Patent Application No. 2005-224335. The entire disclosure of Japanese Patent Application No. 2005-224335 is hereby incorporated herein by reference.

BACKGROUND OF THE INVENTION

1. Field of the Invention

The present invention generally relates to an obstacle verification system for predicting the possibility of a preceding object becoming an obstacle in the future.

2. Background Information

Some examples of obstacle verification systems are disclosed in Japanese Laid-Open Patent Publication Nos. 2003-16599, 2003-72415 and 2004-271513. In the obstacle verification system disclosed in Japanese Laid-Open Patent Publication No. 2003-16599, a preceding vehicle in an adjacent lane is detected to be changing lanes to squeeze ahead of the host vehicle when the obstacle verification system senses lateral movement of the preceding vehicle approaching the host vehicle or when lateral and longitudinal distances relative to the host vehicle are lower than prescribed values.

In the obstacle verification system disclosed in Japanese Laid-Open Patent Publication No. 2003-72415, the obstacle verification system predicts when another vehicle will move between the host vehicle and a preceding vehicle. In the obstacle verification system disclosed in Japanese Laid-Open Patent Publication No. 2004-271513, the obstacle verification system determines when a preceding vehicle in an adjacent lane is changing lanes to squeezing ahead of the host vehicle based on conditions between the preceding vehicle in an adjacent lane and the another vehicle in the adjacent lane.

SUMMARY OF THE INVENTION

Above mentioned obstacle verification systems can detect a preceding obstacle. However, more accurate detection is desirable due to the development of vehicle driving assistant systems. Especially in vehicles equipped with an automatic vehicle distance and speed control system, precise awareness of the vehicle driving condition is very desirable for producing high performance.

To attain the above mentioned object and other objects of the present invention, an obstacle verification system in accordance with the present invention is provided that basically comprises an object detecting section, a vehicle running state detecting section, a traveling scene determining section, a preliminary obstacle verifying section, a precision determining section and a final obstacle verifying section. The object detecting section is configured to detect a preceding object existing in front of a host vehicle. The vehicle running state detecting section is configured to output a running state detection result indicative of a vehicle running state. The traveling scene determining section is configured to determine a current traveling scene based on the preceding object detected by the object detecting section and the running state of the host vehicle detected by the vehicle running state detecting section. The preliminary obstacle verifying section is configured to make preliminary determinations as to whether the preceding object will become an obstacle using a plurality of verification methods based on the preceding object detected by the object detecting section and the running state of the host vehicle detected by the vehicle running state detecting section. The precision determining section is configured to determine a degree of precision regarding each of the preliminary determinations obtained by the preliminary obstacle verifying section using the plurality of verification methods. The final obstacle verifying section is configured to calculate a verification result based on the preliminary determinations obtained by the preliminary obstacle verifying section using the verification methods and based on the current traveling scene determined by the traveling scene determining section. The final obstacle verifying section is further configured to make a final determination as to whether the preceding object will become an obstacle based on the verification result and the degree of precisions determined by the precision determining section.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
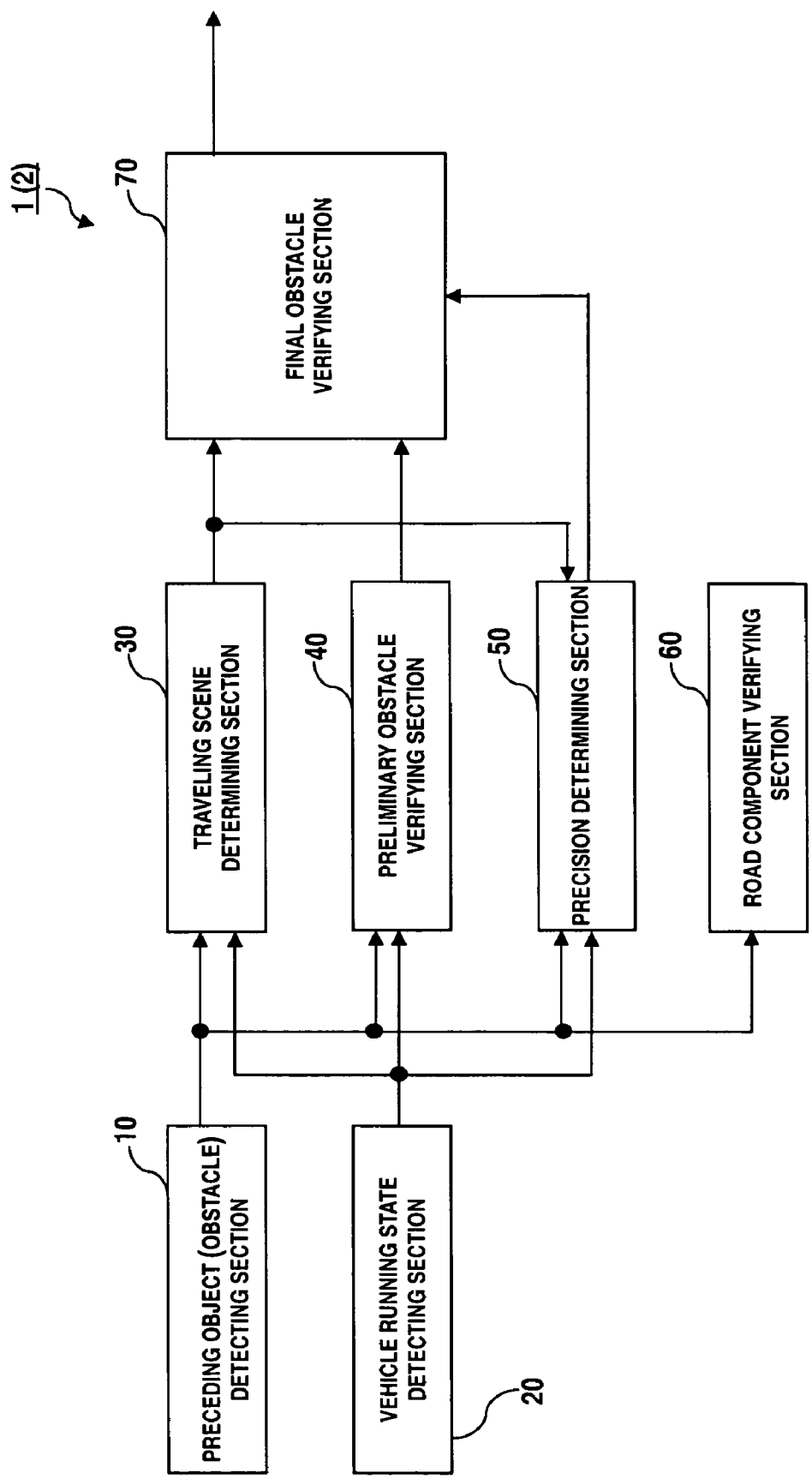
FIG. 1 is a block diagram of an obstacle verification system in accordance with a first embodiment of the present invention.

Referring initially to FIGS. 1 to 13, an obstacle verification system 1 is illustrated in accordance with a first embodiment of the present invention. FIG. 1 is a block diagram illustrating selected software features of the obstacle verification system 1 in accordance with the present invention. As shown in FIG. 1, the obstacle verification system 1 determines when a preceding object existing in front of a host vehicle. Stated differently, the obstacle verification system 1 detects when the host vehicle will most likely contact or rapidly approach the preceding object in the future. Additionally, when the obstacle verification system 1 determines that a preceding object will become an obstacle, the obstacle verification system 1 outputs information indicating that the preceding object will become an obstacle to such devices as an alarm device (device for informing the driver) and a brake control device. As a result, the obstacle verification system 1 takes measures in advance to prevent the preceding object from becoming an obstacle.

More specifically, the obstacle verification system 1 includes a preceding object (obstacle) detecting unit or section 10, a vehicle running state detecting unit or section 20, a traveling scene determining unit or section 30, and a preliminary obstacle verifying unit or section 40. The obstacle verification system 1 further preferably includes a precision determining unit or section 50, a road component verifying unit or section 60, and a final obstacle verifying unit or section 70.

The preceding object detecting section 10 detects a preceding object in front of the host vehicle. More specifically, the preceding object detecting section 10 has a laser radar or other detecting device (detector) that detects a preceding object existing within a prescribed region in front of the host vehicle. The laser radar is configured and arranged on the host vehicle to detect the position, direction of motion, motion speed, width dimension, etc., of the preceding object.

The vehicle running state detecting section 20 detects the running state of the host vehicle. More specifically, the running state of the vehicle is detected as, for example, one or more of the following conditions: vehicle position, direction of vehicle motion, vehicle speed, vehicle steering state, and etc.

The traveling scene determining section 30 determines if a particular traveling scene exists based on the preceding object detected in front of the vehicle by the preceding object detecting section 10 and the running state of the vehicle detected by the vehicle running state detecting section 20. More specifically, the traveling scene determining section 30 stores at least two (a plurality of) traveling scenes. For example, conditions indicative of a vehicle lane-change scene or situation and conditions indicative of a following scene or situation are prestored in the traveling scene determining section 30. The traveling scene determining section 30 determines if the detected preceding object and the vehicle running state match (correspond to) either the lane-change scene or the following scene. In this embodiment, the lane-change scene refers to a traffic situation in. which either the host vehicle or another vehicle changes lanes. The following scene refers to a traffic situation in which the host vehicle follows a preceding vehicle.

Still more specifically, for example, the traveling scene determining section 30 determines a lane-change scene exists when the preceding object approaches the host vehicle while moving laterally and determines a following scene exists when the preceding object approaches the host vehicle without moving laterally.

The preliminary obstacle verifying section 40 makes preliminary determinations of preceding objects becoming obstacles in the future. The preliminary obstacle verifying section 40 determines the preceding object will become an obstacle in the future based on the preceding object detected by the preceding object detecting section 10 and the running state of the host vehicle detected by the vehicle running state detecting section 20. The preliminary obstacle verifying section 40 uses a plurality of verification methods to make the preliminary determinations of the preceding object becoming an obstacle in the future.

In this embodiment, the preliminary obstacle verifying section 40 is configured use a high accuracy method and a medium accuracy method to make the preliminary determinations of the preceding object becoming an obstacle in the future. The high accuracy method determines the possibility of the preceding object becoming an obstacle with a relatively high degree of accuracy. The medium accuracy method determines the possibility of the preceding object becoming an obstacle with a somewhat high degree of accuracy compared to the high accuracy method by taking into account additional future factors. In other words, while the high accuracy method determines the possibility of the preceding object becoming an obstacle with a high degree of accuracy, its determination is limited to the near future relative to the current point in time. Meanwhile, although the medium accuracy method may be less accurate than the high accuracy method for the near future, it can determine the possibility of the preceding object becoming an obstacle at a more distant point in time than can be determine by the high accuracy method.

Figure 2:
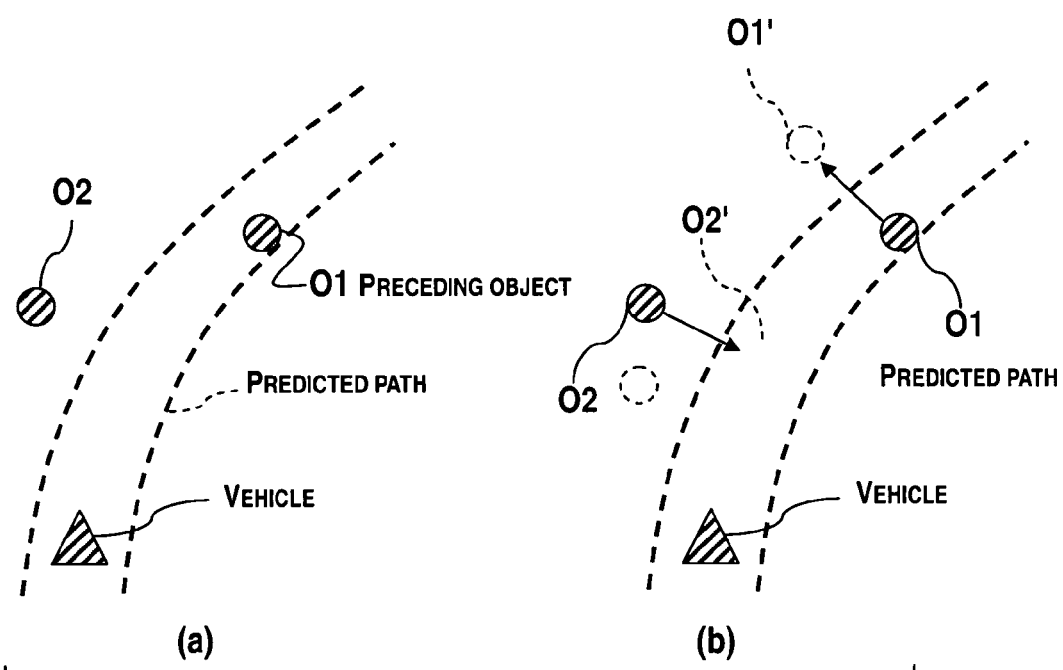
FIG. 2 is a schematic diagram for explaining the high accuracy method in part (a) and the medium accuracy method in part (b)

Both of these methods will now be described in more detail. FIG. 2 is a schematic diagram for explaining the high accuracy method and the medium accuracy method. Part (a) of FIG. 2 illustrates the high accuracy method. Part (b) of FIG. 2 illustrates the medium accuracy method. First, the high accuracy method will be explained. When the preliminary obstacle verifying section 40 executes the high accuracy method, it first predicts the path of the host vehicle based on the running state of the host vehicle detected by the vehicle running state detecting section 20. The preliminary obstacle verifying section 40 then compares the position of the preceding object detected in front of the host vehicle by the preceding object detecting section 10 to the predicted path of the host vehicle. The preliminary obstacle verifying section 40 then makes a preliminary determination as to the possibility of the preceding object becoming an obstacle in the near future.

More specifically, the preliminary obstacle verifying section 40 determines a predicted path of the host vehicle like that shown in part (a) of FIG. 2. The preliminary obstacle verifying section 40 determines the predicted path based on the steering state detected by the vehicle running state detecting section 20. The preliminary obstacle verifying section 40 then compares the predicted path to the position of the preceding object detected by the preceding object detecting section 10. For example, when a preceding object O1 is positioned on the predicted path, the preliminary obstacle verifying section 40 determines the preceding object O1 will become an obstacle in the future. Meanwhile, when a preceding object O2 is not positioned on the predicted path, the preliminary obstacle verifying section 40 determines that the preceding object O2 will not become an obstacle in the future. Preferably, the preliminary obstacle verifying section 40 determines a degree or probability of a preceding object becoming an obstacle in the future rather than simply determining that the preceding object will or will not become an obstacle in the future.

Next, the medium accuracy method will be explained. When the preliminary obstacle verifying section 40 executes the medium accuracy method, the preliminary obstacle verifying section 40 first determines a predicted path of the host vehicle in the same manner as described previously regarding the high accuracy method. The preliminary obstacle verifying section 40 then calculates the position where a preceding object detected by the preceding object detecting section 10 will be after a prescribed amount of time has elapsed. The predicted future position of the detected preceding object is predicted based on the assumption that the preceding object continues to move in the same manner as it is moving at the current time. The preliminary obstacle verifying section 40 then compares the calculated position of the preceding object after the prescribed amount of time has elapsed to the predicted path of the host vehicle. The preliminary obstacle verifying section 40 then makes a preliminary determination as to the possibility of the preceding object becoming an obstacle in the future, i.e., after the prescribed amount of time has elapsed.

More specifically, similarly to the high accuracy method, the preliminary obstacle verifying section 40 determines a predicted path of the host vehicle like that shown in part (b) of FIG. 2 when executing the medium accuracy method. The preliminary obstacle verifying section 40 then finds the positions that the preceding objects detected by the preceding object detecting section 10 will have after a prescribed amount of time has elapsed (indicated as O1' and O2' in part (b) of FIG. 2). The predicted future position of the detected preceding object is predicted based on the assumption that the preceding objects continue to move in the same direction and at the same speed as detected at the current time. Next, the preliminary obstacle verifying section 40 compares the predicted path to the predicted future positions that the preceding objects will have after the prescribed amount of time has elapsed. For example, the predicted future position O2' of the preceding object O2 is positioned on the predicted path of the host vehicle. Therefore, the preliminary obstacle verifying section 40 determines that the preceding object O2 will become an obstacle in the future. Meanwhile, the predicted future position O1' of the preceding object O1 is not positioned on the predicted path. Therefore, the preliminary obstacle verifying section 40 determines that the preceding object O1 will not become an obstacle in the future. Preferably the preliminary obstacle verifying section 40 determines a degree or probability of a preceding object becoming an obstacle in the future rather than simply determining that the preceding object will or will not the preceding object will become an obstacle in the future.

Now referring again to FIG. 1, the precision determining section 50 determines a degree of precision regarding each of the preliminary obstacle verification results obtained by the preliminary obstacle verifying section 40 using the plurality of verification methods. In this embodiment, the precision determining section 50 finds precision degrees indicative of the accuracy of the preliminary obstacle verification result obtained with the high accuracy method and the accuracy of the preliminary obstacle verification result obtained with the medium accuracy method.

The precision determining section 50 determines the precision of the verification result obtained with the high accuracy method based on the lateral width of the preceding object. For example, when the lateral width of the preceding object is a value such as 2 or 3 cm or such as 4 or 5 m or larger, it is highly probable the preceding object is nota preceding vehicle. Therefore, when the lateral width of the preceding object is a value such as 2 or 3 cm or such as 4 or 5 m or larger, the precision determining section 50 calculates a lower precision for the preliminary obstacle verification result (preliminary determination) obtain with the high accuracy method.

The precision determining section 50 calculates a lower precision for the preliminary obstacle verification result (preliminary determination) obtain with the medium accuracy method as the distance between the host vehicle and the preceding object increases. Thus, the precision determining section 50 calculates a lower precision for the preliminary obstacle verification result (preliminary determination) obtain with the medium accuracy method when the distance between the host vehicle and the preceding object has become large. In other words, when the spatial spread between the host vehicle and the preceding object is large, the number of indeterminate factors increases.

The road component verifying section 60 determines when the preceding object is a stationary road component or road infrastructure. A road component or road infrastructure is an object installed along a road in a continuous fashion or at prescribed intervals, e.g., a guard rail, a center divider, or a telephone pole or other pole. When road component verifying section 60 detects that the preceding object is provided in such a manner as to follow the contour of the road, the road component verifying section 60 determines that the preceding object is a guard rail or other road component or road infrastructure. The road component verifying section 60 outputs information indicating its verification result to the precision determining section 50. The precision determining section 50 then determines the precision using the information from the road component verifying section 60.

The final obstacle verifying section 70 calculates a final obstacle verification result obtained with a verification method tailored to the traveling scene determined by the traveling scene determining section 30. In particular, the final obstacle verifying section 70 calculates the final obstacle verification result based on the preliminary determinations obtained by the preliminary obstacle verifying section 40 using the above mentioned verification methods and based on the current traveling scene determined by the traveling scene determining section 30. The final obstacle verifying section then makes a final determination of the probability of the preceding object becoming an obstacle based on the final obstacle verification result and the degree of precisions determined by the precision determining section 50.

The traveling scene determining section 30 determines a following scene exists when a vehicle changing lanes situation or scene does not exist and the host vehicle is merely following a preceding vehicle. In this case, the probability of the host vehicle contacting another vehicle or rapidly approaching another vehicle is small. Therefore, it is appropriate to place more weight (relative importance) on a method having higher accuracy of the present conditions than a method based on a predict condition that occurs farther into the future. In other words, when a following scene exists and the probability of the host vehicle contacting or approaching another vehicle are inherently low, the system may mistakenly determine a high probability of contact or rapidly approaching because the system taking into account too many future factors. Therefore, when a following scene exists, the final obstacle verifying section 70 places more weight on the preliminary obstacle verification result obtained with the high accuracy method when making the final determination as to the probability of the preceding object becoming an obstacle. As a result, the possibility that the system 1 will make an incorrect determination is reduced. Thus, the system 1 can use the high accuracy method to obtain a reliable obstacle verification when the probability of contacting or rapidly approaching a preceding object are high. In addition to placing weight on the preliminary obstacle verification result obtained with the high accuracy method, the final obstacle verifying section 70 also takes into account the precision of the high accuracy method when making the final determination as to the possibility of the preceding object becoming an obstacle.

In this way, the final obstacle verifying section 70 makes a final determination as to the probability of the preceding object becoming an obstacle in the future. As a result, the precision with which the system 1 verifies the probability of the preceding object becoming an obstacle is improved.

When the traveling scene determining section 30 determines a vehicle lane-change scene exists the final obstacle verifying section 70 places more weight on the preliminary obstacle verification result obtained with the medium accuracy method when making the final determination as to the probability of the preceding object becoming an obstacle. When another preceding vehicle from an adjacent lane is changing into the lane of the host vehicle or the host vehicle is changing into the lane of adjacent lane vehicle, the possibility that the two vehicles will contact each other or draw rapidly close to each other is high. Consequently, it is preferable to predict farther into the future in order to prevent contact or near contact from occurring, even if an incorrect determination is more likely to occur. Therefore, when the traveling scene is a vehicle lane-change scene, it is appropriate to place more weight (relative importance) on the medium accuracy method, which can predict farther into the future.

The final obstacle verifying section 70 makes it easier to avoid contacting or rapidly approaching a preceding object by placing weight on the medium accuracy method when a lane-change scene exists.

Figure 3:
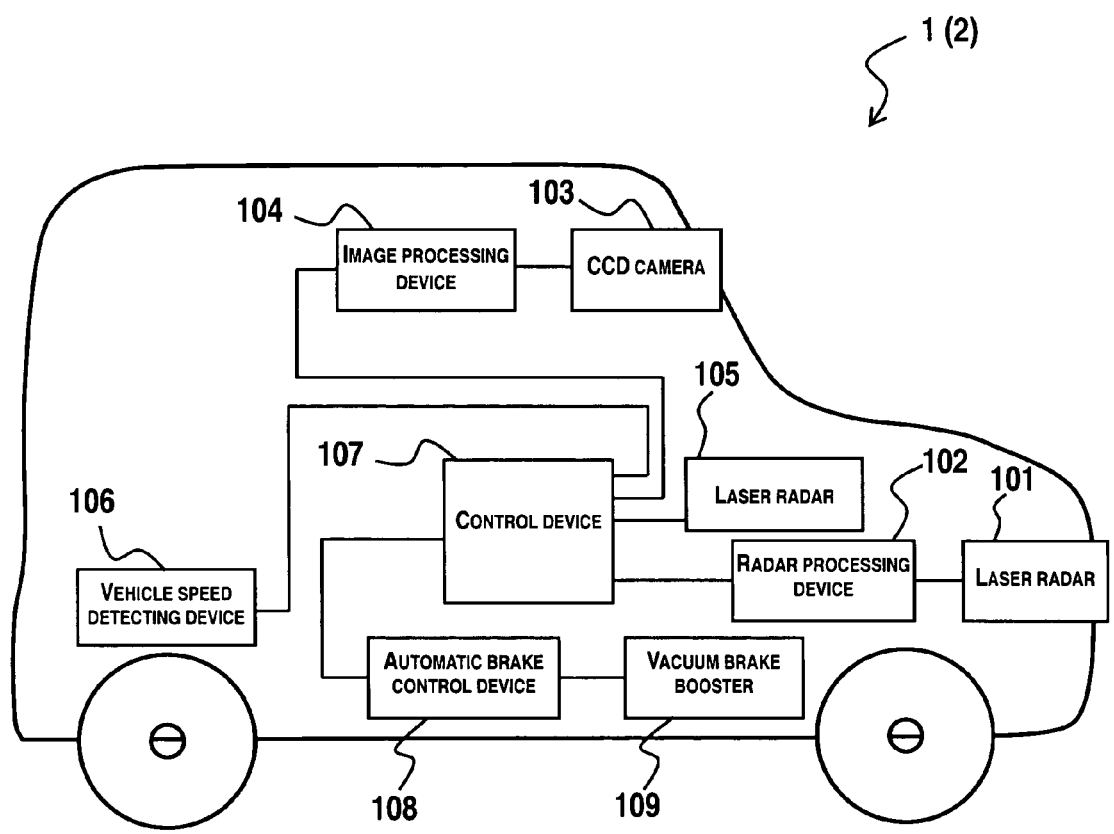
FIG. 3 is a block diagram illustrating selected internal components of the obstacle verification system installed on a vehicle in accordance with the first embodiment of the present invention.

FIG. 3 is a block diagram showing the selected parts of an obstacle verification system in accordance with this embodiment. As shown in the FIG. 3, the obstacle verification system 1 includes a laser radar (detector) 101, a radar processing device 102, a CCD camera 103, an image processing device 104, a steering angle detecting device 105, a vehicle speed detecting device 106, a control device 107, an automatic brake control device 108, and a vacuum brake booster 109.

The laser radar 101 is mounted on the front of the host vehicle such that it can emit laser light in the frontward direction and receive reflected light that results therefrom. The laser radar 101 sends laser light emission information and reflected light reception information to the radar processing device 102. The laser processing device 102 determines an existence of a preceding object in front of the host vehicle as well as position, size, relative velocity, etc., of the preceding object based on the laser light emission information and the reflected light reception information from the laser radar 101. The laser processing device 102 also calculates the coordinates of one or more preceding objects detected on a two-dimensional coordinate system having its origin at the host vehicle and its axes aligned with the following distance direction and the widthwise direction of the host vehicle. The laser processing device 102 also calculates the width (size) of obstacle candidates. The laser radar 101 and the laser processing device 102 constitute the object detecting section 10.

The CCD camera 103 is a progressive scan CCD camera that is configured and arranged on the host vehicle to capture the situation or scene in front of the host vehicle in a high-speed fashion. The CCD camera 103 outputs the captured image results to the image processing device 104. The image processing device 104 processes the image captured by the CCD camera 103. The image processing device 104 determines the probability of a preceding object existing. Upon determining the existence of a preceding object, the image processing device 104 determines position, size, relative velocity, etc., of the preceding object. More specifically, by executing image processing in a targeted region in the vicinity of the preceding object detected by the laser processing device 102, the object can be detected in a new image based on the targeted region even when the detected object is lost by the laser radar due to pitching fluctuation of the host vehicle. Additionally, when an object cannot be detected with the laser radar 101 and the radar processing device 102, the image processing device 104 detects the object in front of the host vehicle based on the entire image captured by the CCD camera 103. The CCD camera 103 and the image processing device 104 constitute the preceding object detecting section 10 described previously.

The image processing device 104 also uses image processing to determine when an object captured by the CCD camera 103 is a road component. Thus, the CCD camera 103 and the image processing device 104 also constitute parts of the road component verifying section 60 described previously.

The steering angle detecting device 105 detects the steering angle of the front wheels of the host vehicle. The host vehicle speed detecting device 106 is arranged in the vicinity of a non-drive wheel. The host vehicle speed detecting device 106 detects the speed of the host vehicle based on the rotation of the non-drive wheel. The devices 105 and 106 constitute parts of the previously described vehicle running state detecting section 20.

The control device 107 receives information from the laser processing device 102, the image processing device 104, the steering angle detecting device 105, and the vehicle speed detecting device 106. The control device 107 determines the traveling scene of the host vehicle based on the information from the devices 102, 104, 105 and 106. The control device makes the preliminary determinations as to the probability of the preceding object becoming an obstacle in the future using the high accuracy method and the medium accuracy method. The control device 107 also determines the precisions of the preliminary obstacle verification results obtained with the high accuracy method and the medium accuracy method. Furthermore, the control device 107 also makes the final determination as to the probability of the preceding object becoming an obstacle in the future based on the preliminary obstacle verification results obtained using a verification method tailored to the traveling scene and on the precisions of those preliminary obstacle verification results. In other words, the control device 107 constitutes parts of the traveling scene determining section 30, the preliminary obstacle verifying section 40, the precision determining section 50, and the final obstacle verifying section 70.

The automatic brake control device 108 executes brake control of the host vehicle to prevent the host vehicle from contacting or rapidly approaching the preceding object when the preceding object is determined to become an obstacle in the future. The vacuum pressure booster 109 delivers any desired braking force to the front and rear wheels by applying a braking force command voltage from the automatic brake control device 108 to a solenoid valve. In this embodiment, in addition to the automatic brake control device 108 and the vacuum brake booster 109, it is also acceptable to provide an alarm device configured to inform the driver that a preceding object has been determined to become an obstacle in the future.

Figure 4:
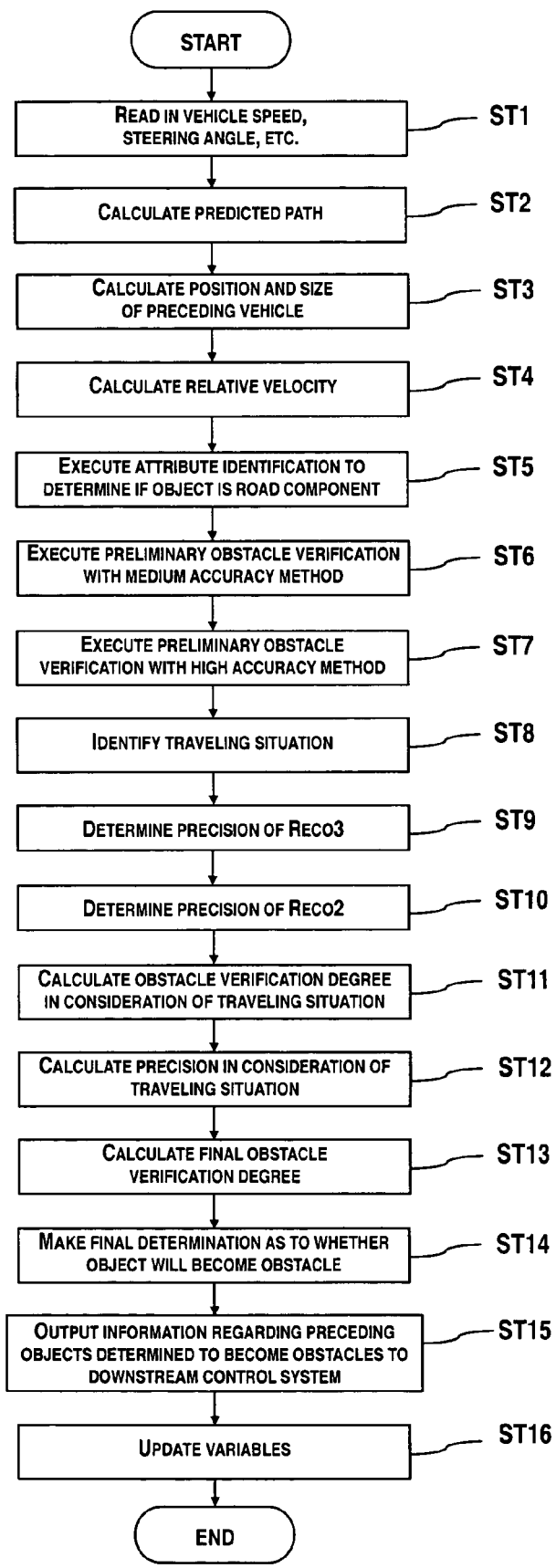
FIG. 4 is a flowchart illustrating the processing steps or operations of the control program executed by the controller of the obstacle verification system in accordance with the first embodiment of the present invention.

The operation of an obstacle verification device 1 in accordance with this embodiment will now be explained. FIG. 4 is a flowchart showing the detailed operations executed by an obstacle verification system 1 in accordance with this embodiment. The control processing loop shown in FIG. 4 starts when the ignition switch of the host vehicle is turned on and, thereafter, is executed once every 100 ms until the ignition switch is turned off.

First, the vehicle running state detecting section 20 reads in information indicating the speed and steering angle of the host vehicle (ST1). Next, the preliminary obstacle verifying section 40 calculates a predicted path of the host vehicle (ST2). More specifically, the preliminary obstacle verifying section 40 determines a radius of curvature Row (1/m) using the equation (1) shown below. This radius of curvature Row is the predicted path of the host vehicle.

$$\text{Row} = 1/\{(1 + A \times Vsp^2 \times LWB)/\text{Steer}\} \quad (1)$$

In the equation, the term A is a stability factor that is a unique value of the host vehicle (a value determined based on the host vehicle weight, the wheel base, the center of gravity, and the lateral force of the tires and can be considered to be constant). Also, the term Vsp is the host vehicle speed (m/s), the term LWB is the length of the wheel base (m), and the term Steer is the steering angle (rad).

Next, the preceding object detecting section 10 reads in information from the laser radar 101 and calculates the position and size (lateral width) of the preceding object (ST3). The lateral position of the preceding object (position in the widthwise direction of the host vehicle) is called $Px\_z0[i]$. The longitudinal position (position in the longitudinal direction of the host vehicle) is called $Px\_z0[i]$. The lateral width of the preceding object is called $objW\_z0[i]$. The portion "z0" indicates that the value is the value detected in this control cycle (the value detected in the previous cycle is indicated with "z1"). The portion "[i]" represents an ID number allocated to each preceding object detected in front of the host vehicle.

Next, the preceding object detecting section 10 detects the relative velocity of each detected preceding object with respect to the host vehicle (ST4). The preceding object detecting section 10 determines the relative velocity of a preceding object with respect to the host vehicle (lateral relative velocity component is called $rVx\_z0[i]$ and longitudinal relative velocity component is called $rVy\_z0[i]$) using the transfer function shown in the equation (2) below (which is a transfer function contrived to take the position detected in step ST3 as input and calculate the relative velocity as output).

$$G(Z) = (cZ^2 - c)/(Z^2 - aZ + b) \quad (2)$$

In the equation (2), the coefficients 1, b, and c are integers that have been dispersed by the sampling cycle time (detection cycle time) of 100 ms so as to have a prescribed pseudo differential quality. In the explanations that follow, the relative velocity in the longitudinal direction of the host vehicle is defined to be negative when the preceding object is approaching the host vehicle and the relative velocity in the widthwise direction of the host vehicle is defined to be negative when the preceding object is moving in the rightward direction of the host vehicle.

Next, the road component verifying section 60 determines whether or not each of the detected preceding objects is a road component (ST5). More specifically, as described previously, when it detects that the preceding object follows the contour of the road, the road component verifying section 60 determines that the preceding object is a guard rail or other road component.

Next, the preliminary obstacle verifying section 40 uses the medium accuracy method to make a preliminary determination as to whether or not each preceding object will become an obstacle in the future (ST6). The preliminary obstacle verifying section 40 then calculates the position where each preceding object detected by the preceding object detecting section 10 will be after a prescribed amount of time has elapsed based on the assumption that the preceding objects continue to move in the same manner as they are moving at the current time. In other words, the preliminary obstacle verifying section 40 determines the position where the preceding object will be by executing the processing described by the three equations shown below.

$$Pv\_T1[i] = Py\_z0[i]/Vsp \quad (3)$$

$$Pv\_Px[i] = rVx\_z0[i] \times Pv\_T1[i] + Px\_z0[i] \quad (4)$$

$$Pv\_Py[i] = rVy\_z0[i] \times Pv\_T1[i] + Py\_z0[i] \quad (5)$$

More specifically, the preliminary obstacle verifying section 40 first calculates the amount of time each preceding object will be assumed to move in the same manner as it is moving at the current time, i.e., the aforementioned prescribed amount of time, using the equation (3). As is clear from the equation (3), the prescribed time $Pv\_T1[i]$ is a time to head way (following time) between the host vehicle and the preceding object. The time to head way is the time required for the host vehicle to reach the current position of the preceding object or substantially reach the current position of the preceding object. In this embodiment, the prescribed time $Pv\_T1[i]$ is the value obtained by dividing the distance $Py\_z0[i]$ from the host vehicle to the preceding object by the host vehicle speed Vsp.

Next, the preliminary obstacle verifying section 40 then uses the equations (4) and (5) to calculate the lateral position Pv_Px[i] and longitudinal position Pv_Py[i] where each preceding object will be after the prescribed amount of time Pv_T1[i] calculated with the equation (3) has elapsed based on the assumption that the relative velocities (rVx_z0[i], rVy_z0[i]) of the preceding objects remain the same.

After the positions the preceding objects will assume after the prescribed time have been calculated, the preliminary obstacle verifying section 40 calculates a degree (degree according to the medium accuracy method) Reco3[i] indicating the likelihood that each preceding object will become an obstacle in the future. The preliminary obstacle verifying section 40 executes the equation (6) in order to calculate each degree Reco3[i].

$$Reco3[i]=func1(Pv\_Px[i], Pv\_Py[i], Row) \quad (6)$$

Figure 5:
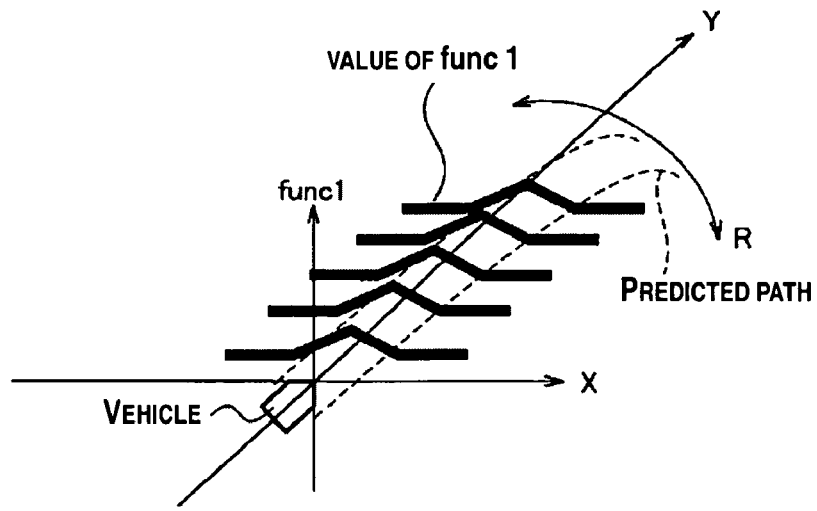
FIG. 5 is a characteristic diagram for explaining the function func1(X, Y, R) of the obstacle verification system in accordance with the first embodiment of the present invention.

The function func1(X, Y, R) of the equation is illustrated in FIG. 5.

Figure 6:
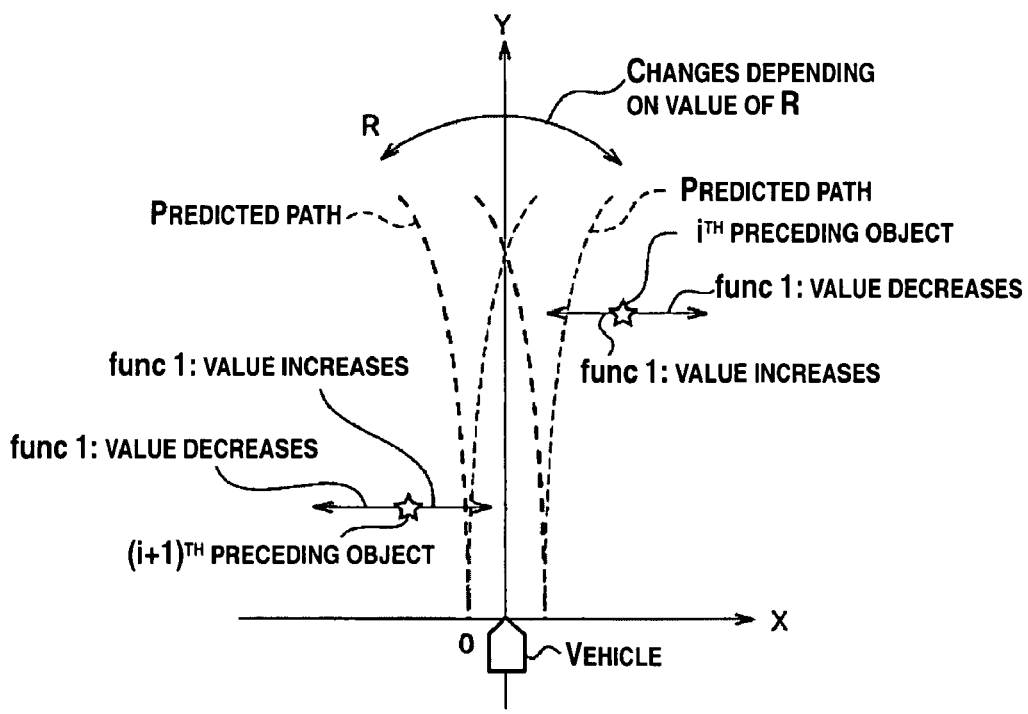
FIG. 6 is a characteristic diagram obtained by viewing the three-dimensional coordinate system shown in FIG. 5 in a two-dimensional form in accordance with the first embodiment of the present invention.

FIG. 5 is a characteristic diagram for explaining the function func1(X, Y, R). As shown in FIG. 5, func1(X, Y, R) is a function of three variables X, Y, and R. In this embodiment, as shown in FIG. 5, the radius of curvature Row indicating the predicted path of the host vehicle is substituted for the variable R. Thus, the broken lines in FIG. 5 indicate the predicted path. FIG. 6 is a characteristic diagram obtained by viewing the three-dimensional coordinate system shown in FIG. 5 in a two-dimensional form. As is clearly shown in FIG. 6, the variable R is a value that determines the predicted path of the host vehicle on the X-Y coordinate system.

Meanwhile, the positions Pv_Px[i] and Pv_Py[i] where the preceding objects will be after the prescribed amount of time are substituted for the variables X and Y. As a result, as shown in FIG. 6, the $i^{th}$ preceding object and the $(i+1)^{th}$ preceding object are plotted on the X-Y coordinate system. The degree Reco3[i] to which it is likely that each preceding object will become an obstacle according to the medium accuracy method is found by comparing the plotted position to the predicted path. More specifically, the value of fund is the maximum value "1" when the plotted position is in the center of the predicted path shown in FIG. 6. Conversely, the value of fund approaches the minimum value "0" as the plotted position moves away center of the predicted path shown in FIG. 6. Here ends the description of the degree (degree according to the medium accuracy method) Reco3[i] to which it is likely that each preceding object will become an obstacle in the future.

Now, refer again to FIG. 4, after finding the obstacle verification degree Reco3[i] using the medium accuracy method, the preliminary obstacle verifying section 40 uses the high accuracy method to make a preliminary determination as to whether or not each preceding object will become an obstacle in the future (ST7). The preliminary obstacle verifying section 40 determines the degree (degree according to the high accuracy method) Reco2[i] to which it is likely that each preceding object will become an obstacle in the future by comparing the preceding object detected by the preceding object detecting section 10 to the predicted path. The preliminary obstacle verifying section 40 executes the equation (7) in order to calculate each degree Reco2[i].

$$Reco2[i]=func1(Px\_z0[i], Py\_z0[i], Row) \quad (7)$$

Here, fund is the same as that shown in FIGS. 5 and 6. In other words, the value of fund is the maximum value "1" when the current position of the preceding object is in the center of the predicted path and the value of fund approaches the minimum value "0" as the current position of the preceding object moves away from center of the predicted path. Here ends the description of the degree (degree according to the high accuracy method) Reco2[i] to which it is likely that each preceding object will become an obstacle in the future.

As described above, after the preliminary obstacle verifying section 40 makes a preliminary determination as to when each preceding object will become an obstacle, the traveling scene determining section 30 determines the traveling scene (ST8). The traveling scene determining section 30 determines the current traveling scene by calculating a value Scene3jdg[i] that indicates how close the traveling scene is to a lane-change scene and a value Scene2jdg[i] indicating how close the traveling scene is to a following scene. More specifically, the values Scene3jdg[i] and Scene2jdg[i] can be calculated using the equations (8) and (9) shown below.

$$Scene3jdg[i]=\{1-func2(rVy\_z0[i])\} \times func3(rVx\_z0[i]) \quad (8)$$

$$Scene2jdg[i]=\{1-func2(rVy\_z0[i])\} \times \{1-func3(rVx\_z0[i])\} \quad (9)$$

Figure 7:
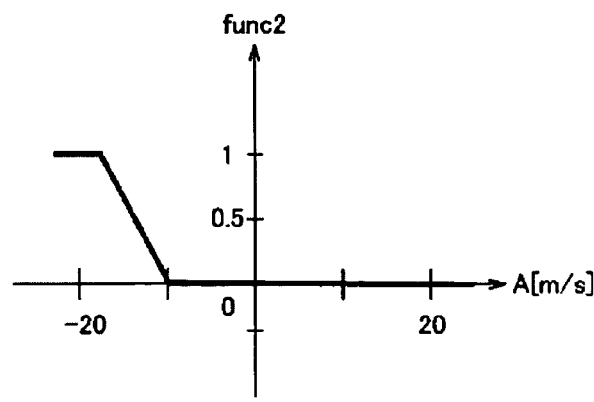
FIG. 7 is a characteristic graph for explaining the function func2(A) of the obstacle verification system in accordance with the first embodiment of the present invention.

The function func2 will now be explained. FIG. 7 is a characteristic diagram for explaining the function func2(A). As shown in FIG. 7, the value of func2(A) remains at the maximum value "1" when A is smaller than −17 (m/s), decreases proportionally as the value of A increases when A is equal to or larger than −17 (m/s) and smaller than −10 (m/s), and remains at the minimum value "0" when A is equal to or larger than −10 (m/s). The relative velocity rVy_z0[i] in the longitudinal direction of the host vehicle calculated in step ST4 is substituted for the variable A of the function func2. Thus, func2 is contrived such that its value increases as the relative velocity of the preceding object in the longitudinal direction of the host vehicle increases in the direction of approaching the host vehicle.

Figure 8:
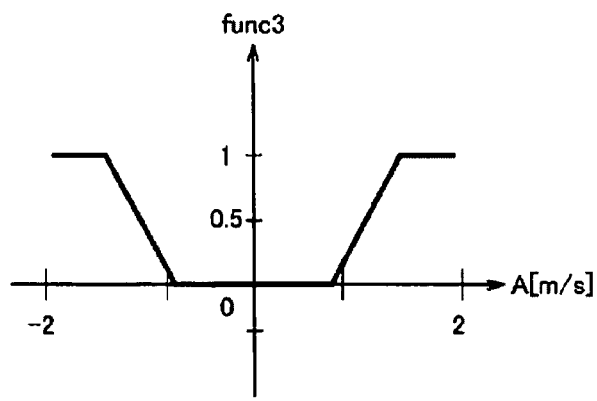
FIG. 8 is a characteristic graph for explaining the function func3(A) of the obstacle verification system in accordance with the first embodiment of the present invention.

Next, func3 will be explained. FIG. 8 is a characteristic diagram for explaining the function func3(A). As shown in FIG. 8, the value of func3(A) remains at the maximum value "1" when A is smaller than −1.5 (m/s) or larger than 1.5 (m/s), decreases proportionally as the value of A increases when A is equal to or larger than −1.5 (m/s) and smaller than −0.9 (m/s), remains at the minimum value "0" when A is equal to or larger than −0.9 (m/s) and smaller than or equal to 0.9 (m/s), and increases proportionally as the value of A increases when A is larger than 0.9 (m/s) and smaller than or equal to 1.5 (m/s). The relative velocity rVx_z0[i] in the widthwise direction of the host vehicle calculated in step ST4 is substituted for the variable A of the function func3. Thus, func3 is contrived such that its value increases as the absolute value of the widthwise relative velocity of the preceding object increases.

As is clear from the equation (8) above, as the longitudinal relative velocity of the preceding object with respect to the host vehicle is in the direction of approaching becomes smaller and as the absolute value of the widthwise relative velocity of the preceding object with respect to the host vehicle becomes larger, the traveling scene determining section 30 sets the value of Scene3jdg[i] to a higher value. Thus, the traveling scene determining section 30 determines the matching degree of the lane-change scene to be higher, as the longitudinal relative velocity of the preceding object becomes smaller and as the absolute value of the widthwise relative velocity of the preceding object becomes larger. When the absolute value of the widthwise relative velocity is large, the chances are high that either the host vehicle or another vehicle is moving laterally so as to change lanes. When the longitudinal relative velocity is large in the direction of approaching the host vehicle, the traveling scene is more likely to be an emergency scene or situation (the host vehicle rapidly approaching a preceding object) rather than a lane-change scene. Therefore, as the longitudinal relative velocity in the direction of approaching the host vehicle becomes the smaller and as the absolute value of the widthwise relative velocity becomes the larger, the traveling scene determining section 30 determines the matching degree of the lane-change scene to be the higher.

As is clear from the equation (9) above, as the longitudinal relative velocity of the preceding object with respect to the host vehicle in the direction of approaching the host vehicle becomes smaller and the absolute value of the widthwise relative velocity of the preceding object with respect to the host vehicle becomes smaller, the traveling scene determining section 30 sets the value of Scene2jdg[i] to a higher value. Thus, the traveling scene determining section 30 determines the matching degree of the following scene to be higher, as the longitudinal relative velocity of the preceding object becomes smaller and as the absolute value of the widthwise relative velocity of the preceding object becomes smaller. When the absolute value of the widthwise relative velocity of the preceding object with respect to the host vehicle is smaller, neither the host vehicle nor another vehicle is moving laterally. Thus, a lane-change scene does not exist in this situation. In other words, the host vehicle is following a preceding vehicle. When the longitudinal relative velocity in the direction of approaching the host vehicle is large, the traveling scene is more likely to be an emergency scene or situation (the host vehicle rapidly approaching a preceding object) than a following scene or situation. Therefore, as the longitudinal relative velocity in the direction of approaching the host vehicle becomes smaller and the absolute value of the widthwise relative velocity becomes smaller, the traveling scene determining section 30 determines the matching degree of the following scene to be higher.

Since the traveling scene determining section 30 does not determine simply whether or not each stored traveling scene matches the currently detected traveling scene but, instead, determines the degree to which each stored traveling scene matches the current traveling scene, it can access the current traveling scene in more detail. For example, it can recognize if the current traveling scene is a lane-change scene that is close to a following scene.

After the traveling scene is determined, the precision determining section 50 calculates the precisions of each degree Reco3[i], i.e., preliminary obstacle verification result, obtained using the medium accuracy method (ST9). More specifically, the precision determining section 50 calculates the precision Prec3jdg[i] of each degree Reco3[i] by executing the equation (10) shown below.

$$Prec3jdg[i]=func4(Py\_z0[i]) \times func5(AttrInfra[i]) \quad (10)$$

Figure 9:
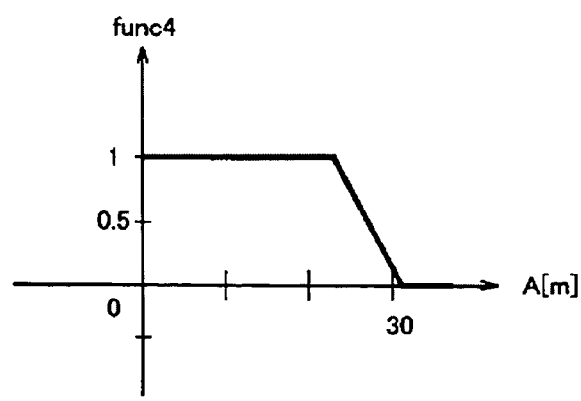
FIG. 9 is a characteristic graph for explaining the function func4(A) of the obstacle verification system in accordance with the first embodiment of the present invention.

The function func4 will now be explained. FIG. 9 is a characteristic diagram for explaining the function func4(A). As shown in FIG. 9, the value of func4(A) remains at the maximum value "1" when A is smaller than or equal to 23 (m), decreases as the value of A increases when A is larger than 23 (m) and smaller than or equal to 31 (m), and remains at the minimum value "0" when A is larger than 31 (m). The longitudinal position Py_z0[i], i.e., the distance between the host vehicle and the respective preceding object, is substituted for the variable A of func3. Thus, the value of func4 decreases and the precision determining section 50 lowers the precision Prec3jdg[i] of the preliminary obstacle verification result obtained with the medium accuracy method as the distance between the host vehicle and the preceding object increases. In other words, the precision determining section 50 is configured to lower the precision of the preliminary obstacle verification result obtained with the medium accuracy method when the distance between the host vehicle and the preceding object has become large, thereby causing the spatial spread between the host vehicle and the preceding object to be large and the number of indeterminate factors to be large.

Figure 10:
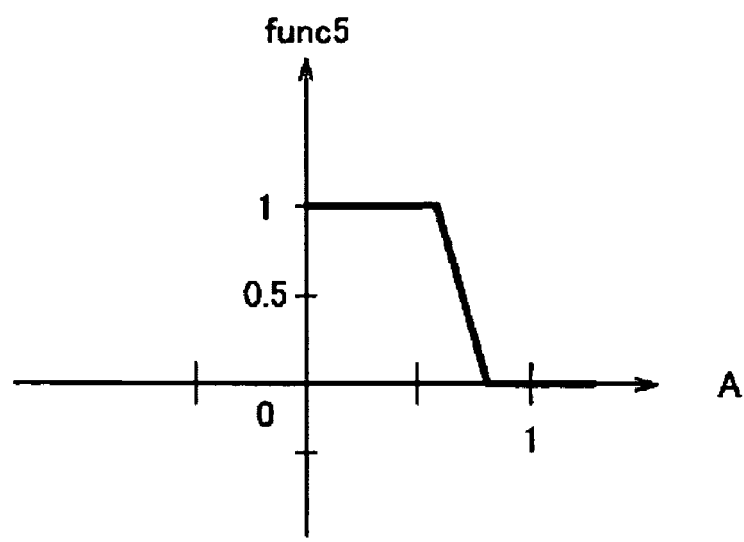
FIG. 10 is a characteristic graph for explaining the function func5(A) of the obstacle verification system in accordance with the first embodiment of the present invention.

Next, func5 will be explained. FIG. 10 is a characteristic diagram for explaining the function func5(A). As shown in FIG. 10, the value of func5(A) is 1 when A=0 and 0 when A=1. The value AttrInfra[i] that is substituted for A in func5 is a value obtained in step ST5 indicating whether or not the preceding object is a road component or infrastructure. In step ST5, the value of AttrInfra[i] is set to 1 if the object is determined to be a road component and 0 if the object is not determined to be a road component. Thus, when the road component verifying section 60 determines that the preceding object is a road component or infrastructure, the value of func5 decreases and the precision determining section 50 lowers the precision Prec3jdg[i] of the preliminary obstacle verification result obtained with the medium accuracy method. When the preceding object is a guard rail or other road component, the chances of the object becoming an obstacle are small so long as the driver does not make a driving mistake. Therefore, when the object in front of the host vehicle is determined to be a road component, the precision determining section 50 lowers the precision Prec3jdg[i] of the preliminary obstacle verification result obtained with the medium accuracy method.

After calculating the precisions Prec3jdg[i] of the preliminary obstacle verification results obtained with the medium accuracy method, the precision determining section 50 calculates the precisions of the degrees Reco2[i], i.e., the preliminary obstacle verification results, obtained with the high accuracy method (ST10). More specifically, the precision determining section 50 calculates the precision Prec2jdg[i] of each degree Reco2[i] by executing the equation (11) shown below.

$$Prec2jdg[i]=func6(objW\_z0[i]) \quad (11)$$

Figure 11:
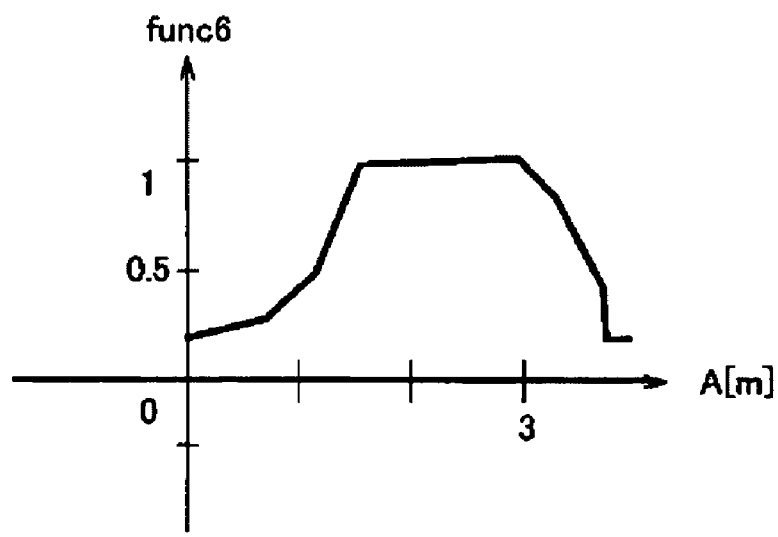
FIG. 11 is a characteristic graph for explaining the function func6(A) of the obstacle verification system in accordance with the first embodiment of the present invention.

The function func6 will now be explained. FIG. 11 is a characteristic diagram for explaining the function func6(A). As shown in FIG. 11, the value of func6(A) is at the minimum value "0.2" when A=0 and when A is larger than 3.6 (m). When A is larger than 0 but less than or equal to 1.5 (m), the value of func6(A) increases as the value of A increases. The value of funct6(A) remains at the maximum value "1" when A is larger than 1.5 (m) and smaller than or equal to 2.9 (m) and decreases as A increases when A is larger than 2.9 (m) and smaller than or equal to 3.6 (m). The lateral width objW_z0[i] of the preceding object calculated in step ST3 is substituted for the variable A of the func6. Thus, the precision determining section 50 determines the precision Prec2jdg[i] of each preliminary obstacle verification result obtained with the high accuracy method based on the lateral width of the preceding object. As a result, the precision Prec2jdg[i] of a preliminary obstacle verification degree Reco2[i] obtained with the high accuracy method can be lowered when the chances are high that the preceding object has been detected incorrectly, e.g., when the lateral width of the respective preceding object is such a value as 2 or 3 cm or a such a value as 4 or 5 m or larger.

After the precisions Prec3jdg[i] and Prec2jdg[i] of the preliminary obstacle verification degrees Reco3[i] and Reco2[i] of the medium accuracy method and the high accuracy method have been calculated as described above, the final obstacle verifying section 70 calculates a final obstacle verification result Reco_tmp[i] obtained with a verification method tailored to the traveling scene (ST11). In this embodiment, the traveling scene is not determined to be either a lane-change scene or a following scene in a simple digital-like fashion. Instead, the system 1 calculates a matching degree of the lane-change scene and a matching degree of the following scene. Consequently, the final obstacle verification result Reco_tmp[i] obtained with a verification method tailored to the traveling scene is calculated as shown in the equation (12) below.

$$Reco\_tmp[i] = Reco3[i] \times \{Scene3jdg[i]/(Scene2jdg[i] + Scene3jdg[i])\} + Reco2[i] \times \{Scene2jdg[i]/(Scene2jdg[i] + Scene3jdg[i])\} \quad (12)$$

With this equation, a final obstacle verification result Reco_tmp[i] obtained with a verification method tailored to the traveling scene is obtained. Since a final obstacle verification result Reco_tmp[i] obtained with a verification method tailored to the traveling scene is obtained, it is necessary for the precision determining section 50 to calculate a precision Prec_tmp[i] corresponding to the final obstacle verification result Reco_tmp[i]. Therefore, the precision determining section 50 calculates a precision Prec_tmp[i] tailored to the traveling scene using the equation (13) shown below (ST12).

$$Prec\_tmp[i] = Prec3jdg[i] \times \{Scene3jdg[i]/(Scene2jdg[i] + Scene3jdg[i])\} + Prec2jdg[i] \times \{Scene2jdg[i]/(Scene2jdg[i] + Scene3jdg[i])\} \quad (13)$$

Then, in consideration of the traveling scene and the precision, the final obstacle verifying section 70 calculates a degree Reco[i] indicating the degree to which it is likely that the preceding object will become an obstacle in the future (ST13). More specifically, the final obstacle verifying section 70 calculates the degree Reco[i] using the equation (14) shown below.

$$Reco[i] = Reco\_tmp[i] \times \{Prec\_tmp[i]/(Prec2jdg[i] + Prec\_tmp[i])\} + Reco2[i] \times \{Prec2jdg[i]/(Prec2jdg[i] + Prec\_tmp[i])\} \quad (14)$$

Although it is acceptable to calculate Reco[i] as Reco_tmp[i] ×Prec_tmp[i], the final obstacle verifying section 70 calculates Reco[i] in a fashion that takes Reco2[i] into account, in this embodiment, as shown in the equation (14). As a result, the final obstacle verifying section 70 makes the final determination of the possibility of the preceding object becoming an obstacle by increasing the weight of the preliminary obstacle verification degree Reco2[i] obtained using the high accuracy method as the precision Prec_tmp[i] of the verification result obtained with a verification method tailored to the traveling scene decreases. When the precision Prec_tmp[i] is low, the preliminary obstacle verification degree Reco[i] would very likely be incorrect and, thus, the prediction as to the possibility of the preceding object becoming an obstacle would probably be very inaccurate if the preliminary obstacle verification degree Reco[i] were calculated using the equation Reco[i] =Reco_tmp[i] ×Prec_tmp[i]. Therefore, the final obstacle verifying section 70 makes the final determination as the possibility of the preceding object becoming an obstacle by calculating Reco[i] as shown in the equation (14) so that the weight of the preliminary obstacle verification degree Reco2[i] obtained with the high accuracy method is increased when the precision Prec_tmp[i] is low. As a result, the accuracy is increased and the chances of incorrectly predicting that an object will or will not become an obstacle can be reduced.

Next, the final obstacle verifying section 70 makes a final determination as to whether or not each preceding object will become an obstacle (ST14). More specifically, the final obstacle verifying section 70 uses the equation (15) to make the final determination as to whether or not each preceding object will become an obstacle.

$$\text{if } (Reco[i] > THR\_OBJ) ObjJdgOn[i] = 1 \text{ else } ObjJdgOn[i] = 0 \quad (15)$$

The equation "if(expression) statement 1 else statement 2" is a function contrived such that statement 1 is executed if the expression is satisfied and statement 2 is executed if the expression is not satisfied. Thus, if the degree Reco[i] that it is likely the object will become an obstacle is larger than a threshold value THR_OBJ, the final obstacle verifying section 70 sets ObjJdgOn[i] to 1 and determines (final determination) that the preceding object will become an obstacle in the future. Meanwhile, if the degree Reco[i] that it is likely the object will become an obstacle is not larger than the threshold value THR_OBJ, the final obstacle verifying section 70 sets ObjJdgOn[i] to 0 and determines (final determination) that the preceding object will not become an obstacle in the future.

Next, the final obstacle determining section 70 sends information regarding the preceding object(s) determined to become obstacles in step ST14 (e.g., the position and relative velocity of the preceding object that is closest to the host vehicle) to a downstream control system (brake control device, alarm device, etc) (ST15). As a result, the downstream control system can execute an appropriate measure (e.g., brake control or informing the driver).

Next, the obstacle verification system 1 changes the variables that will be used in step ST4 of the next detection cycle (sampling). After step ST16, the processing loop ends.

With an obstacle verification system 1 and obstacle verification method in accordance with the first embodiment, preliminary determinations as to the possibility of a preceding object(s) becoming an obstacle in the future can be made with each of a plurality of methods based on the preceding object and the running state of the host vehicle. Thus, preliminary obstacle verification degrees Reco3[i] and Reco2[i] regarding the possibility of the preceding object becoming an obstacle can be obtained using a plurality of verification methods.

Precisions Prec3jdg[i] and Prec2jdg[i] are calculated for each preliminary obstacle verification degrees Reco3[i] and Reco2[i] obtained with the verification methods. Thus, information can be obtained which indicates the accuracy of each of the preliminary obstacle verification degrees Reco3[i] and Reco2[i] obtained with the different verification methods.

Based on the preliminary obstacle verification degrees Reco3[i] and Reco2[i] obtained with the plurality of verification methods, a final obstacle verification result Reco_tmp[i] obtained with a verification method tailored to the traveling scene is calculated. Then, a final determination as to whether the preceding object will become an obstacle is made based on the tailored final obstacle verification result Reco_tmp[i] and the precisions Prec3jdg[i] and Prec2jdg[i]. Thus, a final obstacle verification result Reco tmp[i] that is tailored to the traveling scene is obtained from among the plurality of preliminary obstacle verification degrees Reco3[i] and Reco2[i] and information indicating the accuracy of the obtained final obstacle verification result Reco_tmp[i] is also taken into account in order to make a final determination as the possibility of the preceding object becoming an obstacle.

As a result, the precision with which an object is verified to be an obstacle can be improved.

As indicated in the equation (8), as the longitudinal relative velocity rVy_z0[i] of the preceding object with respect to the host vehicle in the direction of approaching the host vehicle becomes larger and as the absolute value of the relative velocity $rVx\_z0[i]$ of the preceding object with respect to the host vehicle becomes larger, the more likely the obstacle verification system 1 determines the traveling scene is a vehicle lane-change scene in which the host vehicle or another vehicle is changing lanes. When the absolute value of the widthwise relative velocity $rVx\_z0[i]$ is large, the chances are high that either the host vehicle or another vehicle is moving laterally so as to change lanes. When the longitudinal relative velocity $rVy\_z0[i]$ is large in the direction of approaching the host vehicle, the traveling scene is more likely to be an emergency scene or situation rather than a lane-change scene or situation. Therefore, an appropriate determination of the traveling scene can be accomplished by configuring the obstacle verification system 1 such that as the longitudinal relative velocity $rVy\_z0[i]$ in the direction of approaching the host vehicle becomes smaller and as the absolute value of the widthwise relative velocity $rVx\_z0[i]$ becomes larger, the more likely the system 1 is to determine that the traveling scene is a vehicle lane-change scene.

As indicated in the equation (9), as the longitudinal relative velocity $rVy\_z0[i]$ of the preceding object with respect to the host vehicle in the direction of approaching the host vehicle becomes smaller and as the absolute value of the widthwise relative velocity $rVx\_z0[i]$ of the preceding object becomes smaller, the more likely the obstacle verification system 1 determines the traveling scene is a vehicle lane-change scene in which the host vehicle is following a preceding vehicle. When the absolute value of the widthwise relative velocity $rVx\_z0[i]$ of the preceding object is smaller, neither the host vehicle nor another vehicle is moving laterally (i.e., a lane-change scene does not exist). In other words, the host vehicle is following a preceding vehicle. When the longitudinal relative velocity $rVy\_z0[i]$ is large in the direction of approaching the host vehicle, the traveling scene is more likely to be an emergency scene or situation than a lane-change scene or situation. Therefore, an appropriate determination of the traveling scene can be accomplished by configuring the obstacle verification system 1 such that as the longitudinal relative velocity $rVy\_z0[i]$ in the direction of approaching the host vehicle becomes smaller and as the absolute value of the widthwise relative velocity $rVx\_z0[i]$ becomes smaller, the more likely the system 1 determines the traveling scene is a following scene in which the host vehicle is following a preceding vehicle.

Also, as indicated in the equation (7), this obstacle verification system 1 executes a high accuracy method in which the path of the host vehicle is predicted based on the running state of the host vehicle and a preliminary determination as to the possibility of each preceding object becoming an obstacle in the future is made based on a comparison of the predicted path and the position $(Px\_z0[i], Py\_z0[i])$ of the preceding object. Since it determines if the preceding object will become an obstacle by comparing the predicted path and the position of the preceding object, the high accuracy method is an obstacle verification method having a high degree of accuracy.

In other words, the high accuracy method uses one piece of predicted information, i.e., the predicted path of the host vehicle, and one piece of information that does not involve a prediction, i.e., the detected position $(Px\_z0[i], Py\_z0[i])$ of the preceding object, in order to determine if the object will become an obstacle. Thus, the high accuracy method uses only one piece of information that is predicted. Consequently, the high accuracy method achieves a more accurate determination as to the possibility of the preceding object becoming an obstacle in the future because it employs less predicted information, i.e., fewer indeterminate factors, in order to make the determination. Therefore, by executing the high accuracy method, highly accurate preliminary obstacle verifications can be achieved.

Furthermore, as indicated in the equation (6), this obstacle verification system 1 executes a medium accuracy method in which the path of the host vehicle is predicted based on: (1) the running state of the host vehicle; (2) the position $(Pv\_Px[i], Pv\_Py[i])$ where each preceding object will be after a prescribed amount of time has elapsed when the objects continue to move in the same manner as they are currently moving for the duration of the prescribed amount of time; and (3) a preliminary determination as to the possibility of each preceding object becoming an obstacle in the future by comparing the predicted path and the predicted future position $(Px\_z0[i], Py\_z0[i])$ of the preceding object. The medium accuracy method may be less accurate than the high accuracy method in some cases because it determines if the preceding object will become an obstacle based on a comparison of a predicted path and a predicted position $(Px\_z0[i], Py\_z0[i])$ of the object. On the other hand, the medium accuracy method can take future conditions into account to a greater degree than the high accuracy method. More specifically, the medium accuracy method uses two pieces of predicted information, i.e., the predicted path of the host vehicle and the predicted position $(Px\_z0[i], Py\_z0[i])$ of the preceding object, in order to determine if the object will become an obstacle. Consequently, the medium accuracy method can (could possibly) achieve a less accurate determination as to the possibility of the preceding object becoming an obstacle in the future because it employs more predicted information, i.e., more indeterminate factors, in order to make the determination. On the other hand, however, since it includes more future factors, the medium accuracy method can take future factors into account to a greater degree than the high accuracy method (i.e., the medium accuracy method can predict contact or near contact farther into the future than the high accuracy method). Thus, by executing the medium accuracy method, the system 1 can more accurately determine if an object will become an obstacle at a more distant point in the future than the high accuracy method can determine.

As shown in the equation (10), the obstacle verification system 1 lowers the precision of the preliminary obstacle verification result obtained with the medium accuracy method as the distance between the host vehicle and the preceding object (i.e., the longitudinal position $Py\_z0[i]$ of the preceding object) increases. Thus, when the distance between the host vehicle and the preceding object has become large, causing the spatial spread between the host vehicle and the preceding object to be large and the number of indeterminate factors to be large, the obstacle verification unit 1 can calculate an appropriate precision of the verification result by lowering the precision of the preliminary obstacle verification result obtained with the medium accuracy method.

Also, as shown in the equation (10), the obstacle verification system 1 lowers the precision of the preliminary obstacle verification result obtained with the medium accuracy method when it determines that the preceding object is a road component. When the preceding object is a guard rail or other road component, the chances of the object becoming an obstacle are small so long as the driver does not make a driving mistake. Therefore, when the preceding object is determined to be a road component, an appropriate precision of the verification result can be obtained by lowering the precision of the preliminary obstacle verification result obtained with the medium accuracy method.

As shown in the equation (11), the obstacle verification system 1 calculates the precision of the preliminary obstacle verification result obtained with the high accuracy method based on the lateral width objW_z0[i] of the preceding object. When the lateral width objW_z0[i] of the preceding object is such a value as 2 or 3 cm or a such a value as 4 or 5 m or larger, it is highly probable that the preceding object has been detected incorrectly. Therefore, an appropriate precision of the verification result can be obtained by calculating the precision of the preliminary obstacle verification result obtained with the high accuracy method based on the lateral width of the preceding object.

As shown in the equation (3), when calculating the preliminary obstacle verification result according to the medium accuracy method, the time to head way of the host vehicle with respect to the preceding object is used as the amount of time (prescribed amount of time) the preceding object is assumed to maintain the same relative velocity. Since the motion of the preceding object is assumed to remain the same for the amount of time required for the host vehicle to reach or substantially reach the preceding object, an appropriate determination can be made as to whether the host vehicle and the object will contact each other or draw rapidly close to each other and the accuracy of the obstacle verification can be improved.

As shown in the equations (10) and (11), the obstacle verification system determines the matching degree of each stored traveling scene based on the detected preceding object and running state of the host vehicle. Thus, the system 1 can ascertain the current traveling scene in a more detailed fashion by recognizing, for example, if the current traveling scene is a lane-change scene that is close to a following scene.

As shown in the equation (12), when determining a following scene, the final obstacle verifying section 70 places more weight on the preliminary obstacle verification result obtained with the high accuracy method when making the final determination as to the possibility of the preceding object becoming an obstacle. When a vehicle changing lanes does not exist and the host vehicle in which the obstacle verification system 1 is installed is merely following another vehicle, the chances that the host vehicle in which the obstacle verification system 1 is installed will contact the other vehicle or draw rapidly close to the other vehicle are small. Consequently, it is appropriate to place more weight (relative importance) on a method having higher accuracy than a method that is able to predict farther into the future. Therefore, when it is determined that a following scene exists, an appropriate final obstacle verification can be obtained by placing more weight on the preliminary obstacle verification result obtained with the high accuracy method when making the final determination as to whether or not the preceding object will become an obstacle.

As shown in the equation (12), when determining a lane-change scene, the final obstacle verifying section 70 places more weight on the preliminary obstacle verification result obtained with the medium accuracy method when making the final determination as to the possibility of the preceding object becoming an obstacle. When another vehicle is changing into the lane of the host vehicle or the host vehicle is changing into the lane of another vehicle, the possibility that the two vehicles will contact each other or draw rapidly close to each other is high. Consequently, it is appropriate to place more weight on a verification method that can predict farther into the future. Therefore, when it is determined that a lane-change scene exists, an appropriate final obstacle verification can be obtained by placing more weight on the preliminary obstacle verification result obtained with the medium accuracy method when making the final determination as to whether or not the preceding object will become an obstacle.

As shown in the equation (14), the obstacle verification system 1 makes the final determination as to the possibility of the preceding object becoming an obstacle by increasing the weight of the preliminary obstacle verification degree Reco2[i] obtained using the high accuracy method as the precision Prec_tmp[i] of the final obstacle verification result Reco_tmp[i] obtained with a verification method tailored to the traveling scene decreases. When the calculated precision Prec_tmp[i] of the final obstacle verification result Reco_tmp [i] obtained with a verification method tailored to the traveling scene is low, the obstacle verification result Reco_tmp [i] is very likely to be incorrect and, thus, the prediction as to the possibility of the preceding object becoming an obstacle is likely be inaccurate. Therefore, in this embodiment, the weight of the preliminary obstacle verification degree Reco2[i] obtained with the high accuracy method is increased in the final determination as to the possibility of the preceding object becoming an obstacle. As a result, the accuracy can be increased and the chances of obtaining an incorrect obstacle verification, i.e., of incorrectly predicting that an object will or will not become an obstacle, can be reduced.

SECOND EMBODIMENT

Referring now to FIGS. 12 to 22, an obstacle verifying system 2 in accordance with a second embodiment will now be explained. The obstacle verifying system 2 of the second embodiment is basically the same as the obstacle verifying system 1 of the first embodiment, except that the details of the control processing are somewhat different. The second embodiment will be explained in terms of its differences with respect to the first embodiment.

In the second embodiment, an emergency scene or situation is added to the traveling scenes stored in the traveling scene determining section 30. An emergency scene is a situation in which in which it is necessary for the host vehicle to take an emergency avoidance measure. In other words, an emergency scene is a situation in which it is necessary to take a rapid emergency measure to prevent the host vehicle from contacting or nearly contacting a preceding object.

Figure 12:
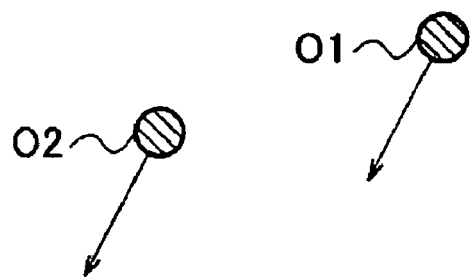
FIG. 12 is a schematic diagram illustrating the high response method of the obstacle verification system in accordance with a second embodiment of the present invention.
Figure 12:

Additionally, in the second embodiment, a high response method is added to the verification methods used by the preliminary obstacle verifying section 40 to make preliminary obstacle verifications. FIG. 12 is a schematic view illustrating the high response method. The preliminary obstacle verifying section 40 executes a high response method that involves determining in a preliminary fashion the possibility of a preceding object becoming an obstacle based on the relative movement direction of the object with respect to the host vehicle and a value expressing a prescribed amount of time that the movement direction is assumed to remain the same. In other words, the preliminary obstacle verifying section 40 determines that a preceding object will become an obstacle if the movement direction of the object is oriented toward the host vehicle. For example, the preceding object O1 shown in FIG. 12 would be determined to become an obstacle.

Figure 13:
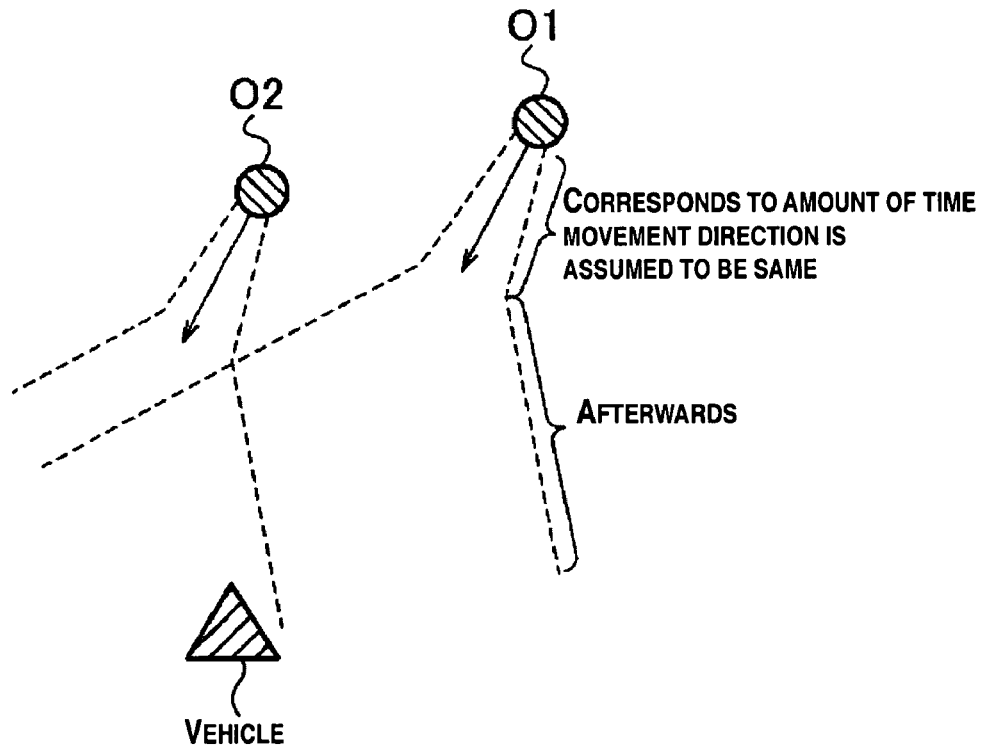
FIG. 13 is a second schematic view illustrating the high response method of the obstacle verification system in accordance with the second embodiment of the present invention.

FIG. 13 is a second schematic view illustrating the high response method. The prescribed amount of time the preceding object is assumed to have the same relative movement direction affects the determination as to the possibility of the preceding object becoming an obstacle. As shown in FIG. 13, the longer the prescribed amount of time the movement direction of the preceding object is assumed to remain the same, the more the places to which the preceding object can move are limited. For example, although the preceding object O2 shown in FIG. 13 can feasibly contact the host vehicle, if the prescribed amount of time is long, the places it can move to will be limited and it will not be able to contact the host vehicle.

The preliminary obstacle verifying section 40 determines if a preceding object will become an obstacle in the future using the high response method as shown in FIGS. 12 and 13. The high response method can predict contact or near contact even farther into the future than the medium accuracy method. For example, since the medium accuracy method assumes the relative velocity of the preceding object remains the same for a prescribed amount of time, the medium accuracy method can predict contact or near contact farther into the future than the high accuracy method by the amount of the prescribed time. Conversely, the high response method is not restricted by a prescribed amount of time in the manner of the medium accuracy method. Instead, it can determine that a preceding object will become an obstacle merely if the relative movement direction is oriented toward the host vehicle. Thus, the high response method can predict that a preceding object will become an obstacle the farthest into the future of the three methods.

Since the high response method takes into account the value of a prescribed amount of time that the relative movement direction is assumed to remain the same, the accuracy with which the high response method verifies if a preceding object will become an obstacle is not excessively poor. As shown in FIG. 13, a certain degree of accuracy can be maintained because the value of the prescribed amount of time limits the range of places to which the preceding object can move.

In the second embodiment, if the traveling scene determining section 30 determines that the traveling scene is an emergency scene or situation, the final obstacle verifying section 70 places weight on the preliminary obstacle verification result obtained with the high response method when making the final determination as to the possibility of the preceding object becoming an obstacle. Since it is difficult to avoid the danger of an emergency scene or situation if avoidance measures are taken after the emergency conditions are clearly evident, it is appropriate to place more weight on a verification method that can predict farther into the future than a verification method that verifies obstacles more accurately. Therefore, when an emergency scene or situation exists, the final obstacle verifying section 70 can obtain an appropriate final obstacle verification by placing more weight on the preliminary obstacle verification result obtained with the high response method when making the final determination as to whether or not the preceding object will become an obstacle.

Figure 14:
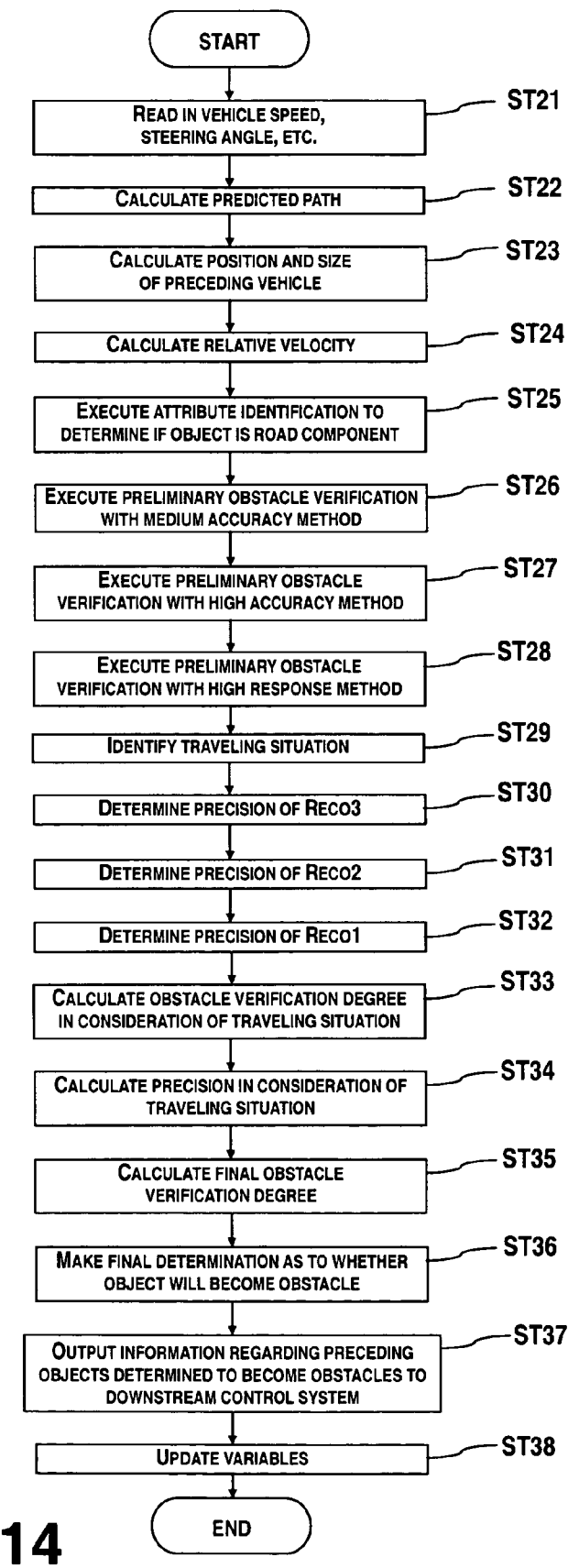
FIG. 14 is a flowchart illustrating the processing steps or operations of the control program executed by the controller of the obstacle verification system in accordance with the second embodiment of the present invention.

The operation of an obstacle verification device 2 in accordance with the second embodiment will now be explained in detail. FIG. 14 is a flowchart showing the detailed operations executed by an obstacle verification system 2 in accordance with the second embodiment. Steps ST21 to ST27 of FIG. 14 are the same as the steps ST1 to ST7 of FIG. 4 and, thus, explanations thereof are omitted for the sake of brevity. Similarly to the control processing loop shown in FIG. 4, the control processing loop shown in FIG. 14 starts when the ignition switch of the host vehicle is turned on and, thereafter, is executed once every 100 ms until the ignition switch is turned off.

After preliminary determinations as to whether or not the preceding object(s) will become an obstacle(s) have been made with the medium accuracy method and the high accuracy method (after step ST27), the preliminary obstacle verifying section 40 calculates a degree Reco1[i] to which it is likely each preceding object will become an obstacle in the future using the high response method (ST28). First, the preliminary obstacle verifying section 40 calculates the prescribed time Pv_T2 that the relative movement direction of the preceding object will be assumed to remain the same using the equation (16).

$$Pv\_T2 = func9(Steer\_dot) \quad (16)$$

Figure 15:
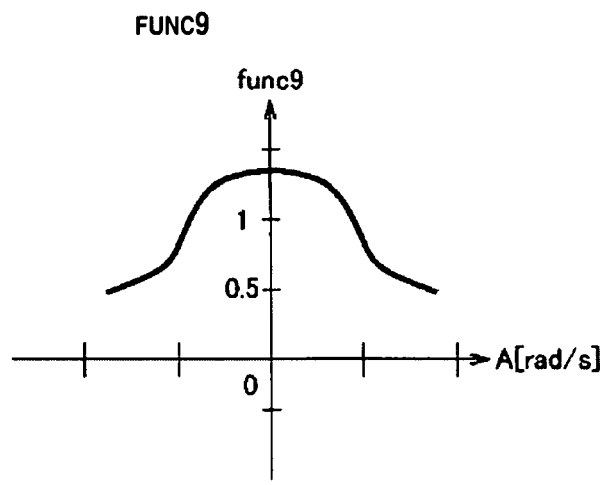
FIG. 15 is a characteristic graph for explaining the function func9(A) of the obstacle verification system in accordance with the second embodiment of the present invention.

The function func9 will now be explained. FIG. 15 is a characteristic diagram for explaining the function func9(A). As shown in FIG. 15, the function func9(A) is configured such that its value increases as the absolute value of A decreases. The steering angular velocity Steer_dot (rad/s) is substituted for the variable A in func9. As a result, the closer the steering angular velocity becomes to zero, the larger the value of func9 becomes. In other words, as the closer the steering angular velocity becomes to zero, the value of the prescribed time Pv_T2 calculated by the preliminary obstacle verifying section 40 becomes longer. Conversely, the farther the steering angular velocity deviates from zero, the more the driver can be assumed to be moving the steering wheel and the chances that the host vehicle is traveling on a mountain road or other curvy road increase. When the steering angular velocity is close to zero, the steering wheel is being held in a constant state and the chances are higher that the relative movement direction of the preceding object will remain the same. Therefore, the preliminary obstacle verifying section 40 is configured such that the closer the steering angular velocity is to zero, the larger the value (longer time) to which it sets the prescribed amount of time.

After calculating the prescribed time Pv_T2, the preliminary obstacle verifying section 40 calculates the degree Reco1[i] to which it is likely that each preceding object will become an obstacle in the future using the high response method. The preliminary obstacle verifying section 40 executes the equation (17) in order to calculate each degree Reco1[i].

$$Reco1[i] = func7(Px\_z0[i], Py\_z0[i], rVx\_z0[i], rVy\_z0[i]) \times func8(Py\_z0[i]/rVy\_z0[i], Pv\_T2) \quad (17)$$

Figure 16:
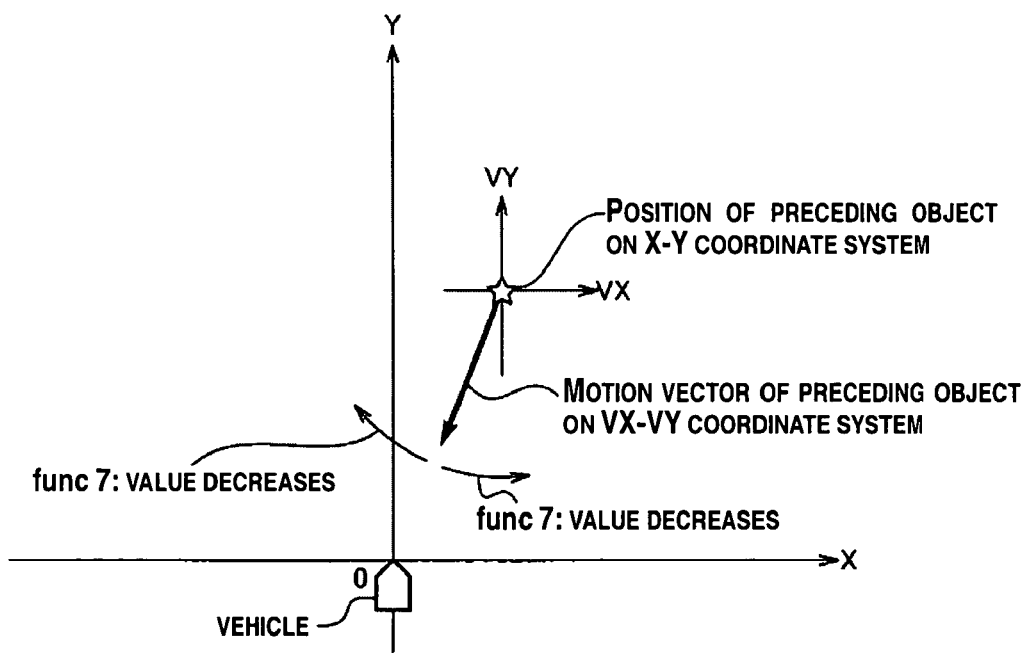
FIG. 16 is a characteristic diagram for explaining the function func7(X, Y, VX, VY) of the obstacle verification system in accordance with the second embodiment of the present invention.

The function func7(X, Y, VX, VY) of the equation is illustrated in FIG. 16. FIG. 16 is a characteristic diagram for explaining the function func7(X, Y, VX, VY). As shown in FIG. 16, func7(X, Y, VX, VY) is a function of four variables X, Y, VX and VY. The current lateral and longitudinal positions Px_z0[i] and Py_z0[i] of the preceding object are substituted for the variables X and Y. The position of the preceding object is expressed as a coordinate on an X-Y coordinate system, as shown in FIG. 16. The current lateral and longitudinal relative velocities rVx_z0[i] and rVy_z0[i] of the preceding object are substituted for the variables VX and VY. The relative velocity of the preceding object is expressed as a vector on a VX-VY coordinate system, as shown in FIG. 16. The value of func7 is high when the motion vector of the preceding object is oriented toward the host vehicle and decreases as the motion vector deviates farther away from the direction of the host vehicle.

Figure 17:
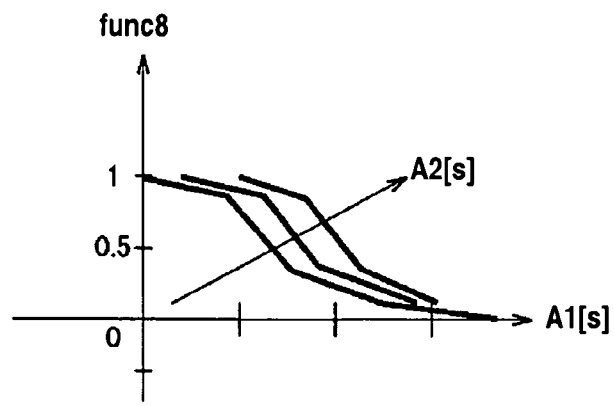
FIG. 17 is a characteristic graph for explaining the function func8(A1, A2) of the obstacle verification system in accordance with the second embodiment of the present invention.

The function func8(A1, A2) of the equation is illustrated in FIG. 17. FIG. 17 is a characteristic diagram for explaining the function func8(A1, A2). As shown in FIG. 17, func8(A1, A2) is a function of two variables A1 and A2 and is contrived such that its value decreases as the value of A1 increases and increases as the value of A2 increases. The time to head way, i.e., Py_z0[i]/rVy_z0[i], is substituted for the variable A1. Thus, as the time to head way (i.e., the shorter the amount of time before contact) becomes smaller, the value of func8(A1, A2) becomes larger. The prescribed amount of time Pv_T2 is substituted for the variable A2. Thus, as the prescribed time Pv_T2 becomes larger, the value of func8(A1, A2) becomes larger.

When the motion vector used in func7 is oriented toward the host vehicle, the value of Reco1[i] increases because the chances of the preceding object contacting the host vehicle are higher. When the time to head way is long (large), the value of Reco1[i] decreases because the chances of the preceding object contacting the host vehicle are smaller. When the prescribed amount of time is shorter, the value of Reco1[i] decreases because there is a wider range of movement possibilities for the preceding object, as shown in FIG. 13.

In step S28, it is also acceptable to calculate the prescribed amount of time Pv_T2 that the preceding object is assumed to maintain the same relative movement direction using the equation (18) shown below. In other words, the preliminary obstacle verifying section 40 can use the equation (18) in order to calculate the prescribed amount of time Pv_T2.

$$Pv\_T2=func9(\text{Steer\_dot})\times func14(asb(\text{Steer}),Vsp\_dot) \quad (18)$$

Figure 18:
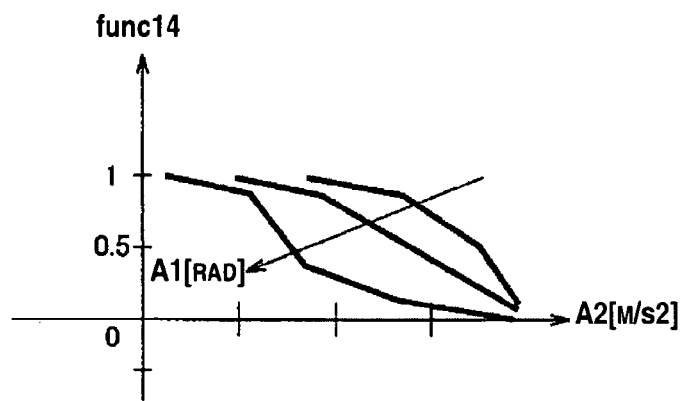
FIG. 18 is a characteristic graph for explaining the function func14(A1, A2) of the obstacle verification system in accordance with the second embodiment of the present invention.

The function func14 will now be explained. FIG. 18 is a characteristic diagram for explaining the function func14 (A1, A2). As shown in FIG. 18, the function func14(A1, A2) is configured such that its value decreases as the value of the variable A1 increases. Similarly, the value of func14(A1, A2) decreases as the value of the variable A2 increases. The absolute value of the steering angle abs(Steer) (rad) is substituted for the variable A1 in func14. As a result, the closer the absolute value of the steering angle becomes to zero, the larger the value of func14 becomes. In other words, as the closer the absolute value of the steering angle becomes to zero, the value of the prescribed time Pv_T2 calculated by the preliminary obstacle verifying section 40 becomes longer. The acceleration of the host vehicle is substituted for the variable A2. As a result, as the host vehicle acceleration becomes larger, the value of func14 becomes smaller. In other words, the value of the prescribed time Pv_T2 calculated by the preliminary obstacle verifying section 40 becomes shorter as the host vehicle acceleration becomes larger.

When the absolute value of the steering angle is large and the acceleration of the host vehicle is large, the path of the host vehicle is changing greatly and the relative movement direction of the preceding object is changing greatly. Consequently, the accuracy of a preliminary obstacle verification result obtained with the high response method is low. Therefore, the preliminary obstacle verifying section 40 shortens the prescribed amount of time when the absolute value of the steering angle is large and the acceleration of the host vehicle is large.

Now, referring again to FIG. 14. After the degree Reco1 [i] to which it is likely that each object will become an obstacle has been calculated using the high response method, the traveling scene determining section 30 determines the traveling scene (ST29). Similarly to the first embodiment, the traveling scene determining section 30 calculates a value Scene3jdg[i] that indicates how close the traveling scene is to a lane-change scene (i.e., the matching degree of the stored lane-change scene) and a value Scene2jdg[i] indicating how close the traveling scene is to a following scene (i.e., the matching degree of the stored following scene).

Additionally, the traveling scene determining section 30 calculates a value Scene1jdg[i] that indicates how close the traveling scene is to an emergency scene or situation (i.e., the matching degree of the stored emergency scene or situation). The traveling scene determining section 30 calculates the value Scene1jdg[i] using the equation (19) shown below.

$$Scene1jdg[i]=func2(rVy\_z0[i]) \quad (19)$$

The function func2(A) is the same as that shown in FIG. 7 and explained previously. The relative velocity rVy_z0[i] of the preceding object in the longitudinal direction of the host vehicle is substituted for the variable A. Thus, as the longitudinal relative velocity rVy_z0[i] of the preceding object with respect to the host vehicle in the direction of approaching the host vehicle becomes larger, the more likely the traveling scene determining section 30 determines the traveling scene is an emergency scene or situation. When the longitudinal relative velocity is large in the direction of approaching the host vehicle, the preceding object is rapidly approaching the host vehicle and an emergency scene or situation exists. Therefore, the system 2 is configured such that as the relative velocity in the direction of approaching the host vehicle along the longitudinal direction of the host vehicle becomes larger, the more likely the traveling scene determining section 30 determines the traveling scene is an emergency scene or situation.

In step ST29, the traveling scene determining section 30 finds a matching degree for each of the lane-change scene, the following scene, and the emergency scene. Then, similarly to the first embodiment, the precision determining section 50 calculates the precision Prec3jdg[i] of each degree Reco3[i] (preliminary obstacle verification result) obtained with the medium accuracy method (ST30). It is also acceptable for the precision determining section 50 to calculate the precision Prec3jdg[i] using the equation (20) shown below.

$$Prec3jdg[i]=func10(Py\_z0[i]/Vsp)\times func11(Vsp) \quad (20)$$

Figure 19:
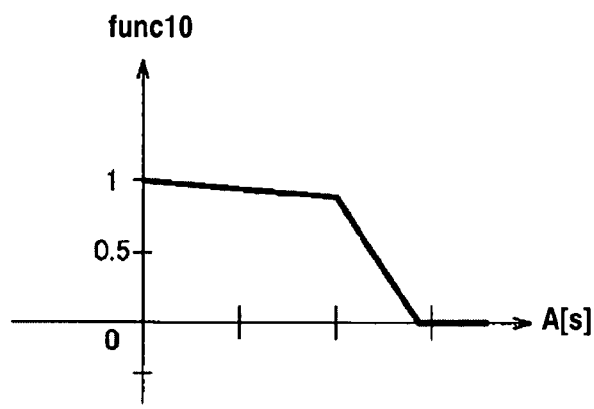
FIG. 19 is a characteristic graph for explaining the function func10(A) of the obstacle verification system in accordance with the second embodiment of the present invention.

The function func10 will now be explained. FIG. 19 is a characteristic diagram for explaining the function func10(A). As shown in FIG. 19, the value of func10(A) is the maximum value 1 when the value of the variable A is 0 and decreases as the variable A increases from 0. The minimum value of the func10(A) is 0. The time to head way Py_z0[i]/Vsp is substituted for the variable A in func10. Consequently, the value of func10 increases as the time to head way Py_z0[i]/Vsp decreases.

Thus, the precision determining section 50 also lowers the precision Prec3jdg[i] of the preliminary obstacle verification result obtained with the medium accuracy method as the time to head way Py_z0[i]/Vsp between the host vehicle and the preceding object increases. In short, the precision determining section 50 is configured to lower the precision Prec3jdg[i] of the preliminary obstacle verification degree Reco3[i] obtained with the medium accuracy method when the number of indeterminate factors is large due to the time until the host vehicle will contact the preceding object in the future being large or the time until the host vehicle will draw rapidly close to the preceding object in the future being large.

Figure 20:
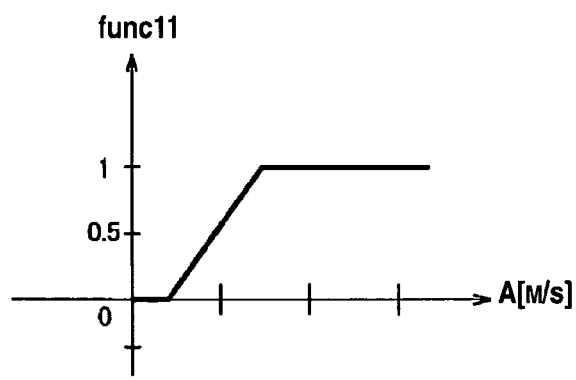
FIG. 20 is a characteristic graph for explaining the function fund11(A) of the obstacle verification system in accordance with the second embodiment of the present invention.

The function func11 will be now explained. FIG. 20 is a characteristic diagram for explaining the function func11(A). As shown in FIG. 20, the value of the function 11 is the minimum value 0 when the value of the variable A is near 0 and otherwise increases as the value of the variable A increases until it reaches a maximum value. The maximum value of the func11(A) is 1. The speed Vsp of the host vehicle detected in step ST21 is substituted for the variable A of the function func11. Thus, func11 is contrived such that its value increases as the host vehicle speed Vsp increases.

Thus, the precision determining section 50 raises the precision Prec3jdg[i] of the preliminary obstacle verification degree Reco3[i] obtained with the medium accuracy method as the host vehicle speed Vsp detected by the host vehicle running state detecting section 20 increases. When the host vehicle speed is high, the chances that the host vehicle will deviate from the predicted path are smaller because the host vehicle cannot suddenly and acutely change directions.

Therefore, the precision determining section 50 raises the precision Prec3jdg[i] of the preliminary obstacle verification degree Reco3[i] obtained with the medium accuracy method as the host vehicle speed Vsp increases.

Then, similarly to the first embodiment, the precision determining section 50 calculates the precision Prec2jdg[i] of each degree Reco2[i] (preliminary obstacle verification result) obtained with the high accuracy method (ST31). It is also acceptable for the precision determining section 50 to calculate the precision Prec2jdg[i] using the equations (21) and (22) shown below.

$$Prec2jdg[i]=func12(Theta/THR\_Theta) \quad (21)$$

$$Theta=atan\{abs(Px\_z0[i]/Py\_z0[i])\} \quad (22)$$

As shown in the equations (21) and (22), the precision determining section 50 first finds the direction in which the preceding object exists with respect to the host vehicle before calculating the precision Prec2jdg[i] of the preliminary obstacle verification degree Reco2[i] obtained with the high accuracy method. In other words, the precision determining section 50 first executes the equation (22) to calculate the angle that a straight line joining the host vehicle to the preceding object makes with respect to the longitudinal direction of the host vehicle.

Figure 21:
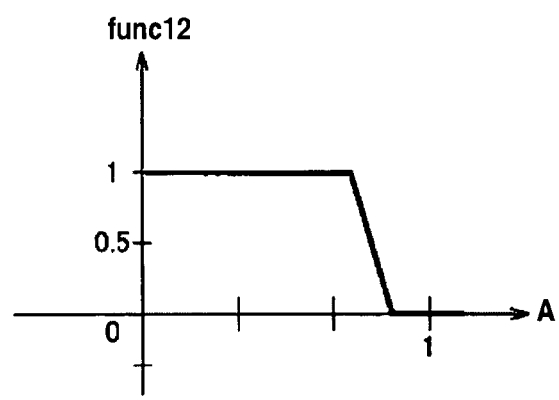
FIG. 21 is a characteristic graph for explaining the function func12(A) of the obstacle verification system in accordance with the second embodiment of the present invention.

Next, the precision determining section 50 executes the equation (21). In equation, THR_Theta is half the viewing angle (the value established as a sensor specification) (rad) of the laser radar 101. The function func12 is shown in FIG. 21. FIG. 21 is a characteristic diagram for explaining the function func12(A). As shown in FIG. 21, the value of func12(A) remains at the maximum value "1" when A is equal to or larger than 0 and smaller than 0.7, decreases proportionally as the value of A increases when A is larger than or equal to 0.7 and smaller than 0.9, and remains at the minimum value "0" when A is equal to or larger than 0.9. The value Theta/THR_Theta is substituted for the variable A in func12. Since the value of THR_Theta is predetermined, the value of func12 increases as the value of Theta obtained with the equation (22) increases. Thus, the precision determining section 50 lowers the precision Prec2jdg[i] of the preliminary obstacle verification degree Reco2[i] obtained with the high accuracy method as the preceding object approaches an edge of a prescribed region in front of the host vehicle (the detection region of the laser radar). The detection precision of a laser radar generally tends to decline at the edges of the detection region. Therefore, the precision determining section 50 lowers the precision Prec2jdg[i] of the preliminary obstacle verification degree Reco2[i] obtained with the high accuracy method as the preceding object approaches an edge (end) of a prescribed region in front of the host vehicle.

Then, the precision determining section 50 calculates the precision Prec1jdg[i] of each degree Reco1[i] (preliminary obstacle verification result) obtained with the high response method (ST32). The precision determining section 50 calculates the precision Prec1jdg[i] using the equation (23) shown below.

$$Prec1jdg[i]=func13(Px\_z0[i])\times func5(AttrMove[i]) \quad (23)$$

Figure 22:
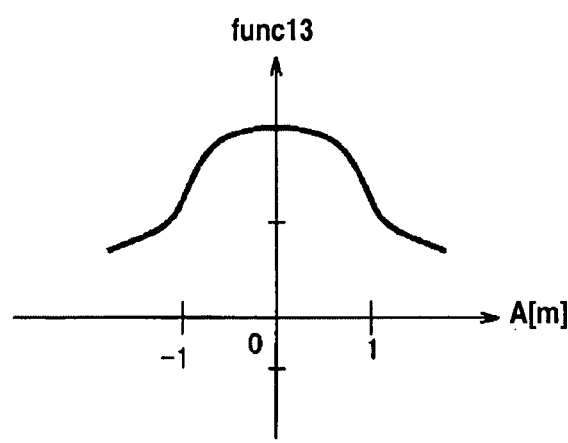
FIG. 22 is a characteristic graph for explaining the function func13(A) of the obstacle verification system in accordance with the second embodiment of the present invention.

In the equation, AttrMove[i] is a function configured to have the value 1 if the $i^{th}$ preceding object is moving and the value 0 if the $i^{th}$ preceding object is stationary. The function func13 is shown in FIG. 22. FIG. 22 is a characteristic diagram for explaining the function func13(A). As shown in FIG. 22, the function func13(A) is configured such that its value increases as the absolute value of A decreases. The lateral position Px_z0[i] of the preceding object is substituted for the variable A in func13. Thus, the precision determining section 50 raises the precision Prec1jdg[i] of the preliminary obstacle verification result Reco1[i] obtained with the high response method as the preceding object approaches the front of the host vehicle. More specifically, the precision determining section 50 raises the precision Prec1jdg[i] of the preliminary obstacle verification result Reco1[i] obtained with the high response method as the preceding object approaches a line extending straight forward from the center of the front of the host vehicle. The detection precision of a laser radar generally tends to decline at the edges of the detection region, but the detection precision tends to be high directly in front of the laser radar. Therefore, the precision determining section 50 is configured to raise the precision Prec1jdg[i] of the preliminary obstacle verification result Reco1[i] obtained with the high response method as the preceding object approaches the front of the host vehicle.

The function func5(A) is the same as that shown in FIG. 10 and explained previously. The AttrMove[i] is substituted for the variable A. Thus, the precision determining section 50 lowers the precision Prec1jdg[i] of the preliminary obstacle verification result Reco1[i] obtained with the high response method when the preceding object is a moving body. When the preceding object is a moving body, the relative movement direction of the preceding object changes due to the motion of the preceding object and the reliability of the preliminary obstacle verification result Reco1[i] obtained with the high response method decreases. Therefore, the precision determining section 50 is configured to lower the precision Prec1jdg[i] of the preliminary obstacle verification result Reco1[i] obtained with the high response method when the preceding object is a moving body.

It is acceptable to determine if the preceding object is a moving body based on whether or not the relative velocity thereof is close to 0 (zero). It is also acceptable to determine if the preceding object is a moving body using the method presented in Japanese Laid-Open Patent Publication No. 2004-348249.

Then, the final obstacle verifying section 70 calculates a final obstacle verification result Reco_tmp[i] obtained with a verification method tailored to the traveling scene (ST33). Since second embodiment involves three traveling scenes instead of two (first embodiment), the final obstacle verification result Reco_tmp[i] obtained with a verification method tailored to the traveling scene is calculated with the equation (24) shown below.

$$Reco\_tmp[i]=Reco1[i]\times\{Scene1jdg[i]/(Scene1jdg[i]+Scene2jdg[i]+Scene3jdg[i])\}+Reco2[i]\times\{Scene2jdg[i]/(Scene1jdg[i]+Scene2jdg[i]+Scene3jdg[i])\}+Reco3[i]\times\{Scene3jdg[i]/(Scene1jdg[i]+Scene2jdg[i]+Scene3jdg[i])\} \quad (24)$$

With this equation, a final obstacle verification result Reco_tmp[i] obtained with a verification method tailored to the traveling scene is obtained. Since a final obstacle verification result Reco_tmp[i] obtained with a verification method tailored to the traveling scene is obtained, the precision determining section 50 calculates a precision Prec_tmp[i] corresponding to the final obstacle verification result Reco_tmp[i]. In the second embodiment, the precision determining section 50 calculates the precision Prec_tmp[i] corresponding to the final obstacle verification result Reco_tmp[i] using the equation (25) shown below.

$$Prec\_tmp[i]=Prec1jdg[i]\times\{Scene1jdg[i]/(Scene1jdg[i]+Scene2jdg[i]+Scene3jdg[i])\}+Prec2jdg[i]\times\{Scene2jdg[i]/(Scene1jdg[i]+Scene2jdg[i]+Scene3jdg[i])\}+Prec3jdg[i]\times\{Scene3jdg[i]/(Scene1jdg[i]+Scene2jdg[i]+Scene3jdg[i])\} \quad (25)$$

Afterwards, the steps ST35 to ST38 shown in FIG. 14 are executed. These steps are the same as the steps ST13 to ST16 of FIG. 4. After step ST38, the processing loop ends.

This, similarly to the first embodiment, the obstacle verifying system 2 and obstacle verifying method in accordance with the second embodiment can improve the precision with which a preceding object is determined to become or not to become an obstacle. Also, the system 2 can ascertain the traveling scene appropriately and achieve highly accurate preliminary obstacle verifications by executing the high accuracy method. Additionally, by executing the medium accuracy method, the system 2 can determine if an object will become an obstacle at a more distant point in the future than with the high accuracy method.

The system 2 can also calculate the precision of the verification result in an appropriate fashion and improve the accuracy of the obstacle verification. The system 2 can also determine the traveling scene in more detail and accomplish an appropriate final determination as to whether or not a preceding object will become an obstacle. The system 2 can also reduce the chances of obtaining an incorrect obstacle verification, i.e., of incorrectly predicting that an object will or will not become an obstacle.

With the second embodiment, as shown in the equation (19), as the longitudinal relative velocity $rVy\_z0[i]$ of the preceding object with respect to the host vehicle in the direction of approaching the host vehicle becomes larger, the more likely the system 2 determines the traveling scene is an emergency scene or situation requiring the host vehicle to take an emergency avoidance measure. When the relative velocity $rVy\_z0[i]$ is large in the direction of approaching the host vehicle along the longitudinal direction of the host vehicle, the preceding object is rapidly approaching the host vehicle and an emergency scene or situation exists. Therefore, an appropriate determination of the traveling scene can be achieved by configuring the system 2 such that the larger the relative velocity $rVy\_z0[i]$ is in the direction of approaching the host vehicle along the longitudinal direction of the host vehicle, the more likely the traveling scene determining section 30 (traveling scene determining section) is to determine that the traveling scene is an emergency scene.

As shown in the equation (17), the system 2 of the second embodiment is configured to execute a high response method that involves determining in a preliminary fashion the possibility of a preceding object becoming an obstacle based on the relative movement direction of the object with respect to the host vehicle and a value expressing a prescribed amount of time $Pv\_t2$ that the movement direction is assumed to remain the same. The high response method can predict contact or near contact even farther into the future than the medium accuracy method. For example, since the medium accuracy method assumes the relative velocity of the preceding object remains the same for a prescribed amount of time, the medium accuracy method can predict contact or near contact farther into the future than the high accuracy method by the amount of the prescribed time. Conversely, the high response method is not restricted by a prescribed amount of time in the manner of the medium accuracy method. Instead, it can determine that a preceding object will become an obstacle merely if the relative movement direction is oriented toward the host vehicle. Thus, the high response method can predict that a preceding object will become an obstacle the farthest into the future of the three methods.

Since the high response method takes into account the value of a prescribed amount of time $Pv\_T2$ that the relative movement direction is assumed to remain the same, the accuracy with which the high response method verifies if a preceding object will become an obstacle is not excessively poor. Instead, a certain degree of accuracy can be maintained because the value of the prescribed amount of time $Pv\_T2$ limits the range of places to which the preceding object can move.

Thus, by executing the high response method, the system 2 can determine if an object will become an obstacle at a more distant point in the future than it can with the high accuracy method or the medium accuracy method.

As shown in the equation (20), the system 2 in accordance with the second embodiment is configured to lower the precision $Prec3jdg[i]$ of the preliminary obstacle verification degree $Reco3[i]$ obtained with the medium accuracy method as the time to head way $Py\_z0[i]/Vsp$ between the host vehicle and the preceding object increases. In other words, the system 2 is configured to lower the precision $Prec3jdg[i]$ of the preliminary obstacle verification degree $Reco3[i]$ obtained with the medium accuracy method when the number of indeterminate factors is large due to the time until the host vehicle will contact the preceding object in the future being large or the time until the host vehicle will draw rapidly close to the preceding object in the future being large. As a result, the system 2 can calculate the precision of the verification result in an appropriate fashion.

Also as shown in the equation (20), the system 2 raises the precision $Prec3jdg[i]$ of the preliminary obstacle verification degree $Reco3[i]$ obtained with the medium accuracy method as the host vehicle speed $Vsp$ increases. When the host vehicle speed is high, the chances that the host vehicle will deviate from the predicted path are smaller because the host vehicle cannot suddenly and acutely change directions. Therefore, the system 2 can calculate the precision of the verification result in an appropriate manner by raising the precision $Prec3jdg[i]$ of the preliminary obstacle verification degree $Reco3[i]$ obtained with the medium accuracy method as the host vehicle speed $Vsp$ increases.

The system 2 in accordance with the second embodiment is configured such that when the preceding object detecting section 10 detects preceding objects existing within a prescribed region in front of the host vehicle, e.g., when the preceding object detecting section 10 is a laser radar 101, the precision $Prec2jdg[i]$ of the preliminary obstacle verification degree $Reco[i]$ obtained with the high accuracy method is lowered as the preceding object approaches an edge of the prescribed region $THR\_Theta$ in front of the host vehicle, as indicated in the equation (21). The detection precision of a laser radar tends to decline at the edges of the detection region. Therefore, the system 2 can calculate the precision of the verification result in an appropriate manner by lowering the precision $Prec2jdg[i]$ of the preliminary obstacle verification degree $Reco[i]$ obtained with the high accuracy method as the preceding object approaches an edge of the prescribed region $THR\_Theta$ in front of the host vehicle.

The system 2 in accordance with the second embodiment is configured such that when the preceding object detecting section 10 detects preceding objects existing within a prescribed region in front of the host vehicle, e.g., when the preceding object detecting section 10 is a laser radar 101, the precision $Prec1jdg[i]$ of the preliminary obstacle verification result $Reco1[i]$ obtained with the high response method is raised as the preceding object approaches the front of the host vehicle, as indicated in the equation (23). The detection precision of a laser radar generally tends to decline at the edges of the detection region, but the detection precision tends to be high directly in front of the laser radar. Therefore, the system 2 can calculate the precision of the verification result in an appropriate manner by raising the precision $Prec1jdg[i]$ of the preliminary obstacle verification result Reco1 [i] obtained with the high accuracy method as the preceding object approaches the front of the host vehicle.

Meanwhile, the system 2 in accordance with the second embodiment is configured to lower the precision Prec1jdg[i] of the preliminary obstacle verification result Reco1[i] obtained with the high response method when the preceding object is a moving body, as indicated in the equation (23). When the preceding object is a moving body, the relative movement direction of the preceding object changes due to the motion of the preceding object and the reliability of the preliminary obstacle verification result Reco1[i] obtained with the high response method decreases. Therefore, the system 2 calculates the precision of the verification result in an appropriate manner by lowering the precision Prec1jdg[i] of the preliminary obstacle verification result Reco1[i] obtained with the high response method when the preceding object is a moving body.

As shown in the equations (16) and (18), the system 2 is configured such that as the steering angular speed Steer_dot of the host vehicle gets closer to zero, the value (longer time) to which the prescribed amount of time Pv_T2 is set to a larger value. The farther the steering angular velocity Steer_dot deviates from zero, the more the driver can be assumed to be moving the steering wheel and the chances that the host vehicle is traveling on a mountain road or other curvy road increase. Conversely, the closer the steering angular velocity Steer_dot becomes to zero, the more the steering wheel is being held in a constant state and the chances are higher that the relative movement direction of the preceding object will remain the same. Therefore, the accuracy of the preliminary obstacle verification result Reco1[i] can be improved by increasing (lengthening) the prescribed amount of time Pv_T2 as the steering angular velocity Steer_dot approaches zero.

As shown in the equation (18), the system 2 in accordance with the second embodiment is configured such that the prescribed amount of time Pv_T2 is shortened as the absolute value of the steering angle Steer of the host vehicle increases and as the acceleration Vsp_dot of the host vehicle increases. When the absolute value of the steering angle Steer of the host vehicle is large and the acceleration Vsp_dot of the host vehicle is large, the path of the host vehicle is changing greatly and the accuracy of the preliminary obstacle verification result Reco1[i] obtained with the high response method decreases. By shortening the prescribed amount of time Pv_T2, the accuracy of the preliminary obstacle verification result Reco1[i] obtained with the high response method can be prevented from decreasing. Therefore, in the second embodiment, the system 2 protects the accuracy of the obstacle verification by shortening the prescribed amount of time Pv_T2 as the absolute value of the steering angle Steer of the host vehicle increases and as the acceleration Vsp_dot of the host vehicle increases.

When it determines that the traveling scene is an emergency scene or situation, a system 2 in accordance with the second embodiment places weight on the preliminary obstacle verification result Reco1[i] obtained with the high response method when making the final determination as to the possibility of the preceding object becoming an obstacle. Since it is difficult to avoid the danger of an emergency scene or situation if avoidance measures are taken after the emergency conditions are clearly evident, it is appropriate to place more weight on a verification method that can predict farther into the future than a verification method that verifies obstacles more accurately. Therefore, the system 2 in accordance with the second embodiment is configured such that when it determines that an emergency scene or situation exists, it can obtain an appropriate final obstacle verification by placing more weight on the preliminary obstacle verification result Reco1[i] obtained with the high response method when making the final determination as to whether or not the preceding object will become an obstacle. The explanations presented above are merely examples. When interpreting the present invention, the invention should not be limited or restrained in any way by the corresponding relationships between the embodiments and the claims.

What is claimed is:

1. An obstacle verification system comprising:
   an object detecting section configured to detect a preceding object existing in front of a host vehicle;
   a vehicle running state detecting section configured to output a running state detection result indicative of a vehicle running state;
   a traveling scene determining section configured to determine a current traveling scene based on both a longitudinal relative velocity of the preceding object detected by the object detection section with respect to the host vehicle in a longitudinal direction of the host vehicle and a transverse relative velocity of the preceding object detected by the object detecting section with respect to the host vehicle in a widthwise direction of the host vehicle;
   a preliminary obstacle verifying section configured to make a plurality of preliminary determinations as to whether the preceding object will become an obstacle using a plurality of verification methods, respectively, with each of the verification methods obtaining the preliminary determinations based on both the preceding object detected by the object detecting section and the running state of the host vehicle detected by the vehicle running state detecting section;
   a precision determining section configured to determine a degree of precision regarding each of the preliminary determinations obtained by the preliminary obstacle verifying section using the verification methods; and
   a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations.

2. The obstacle verification system as recited in claim 1, wherein
   the traveling scene determining section is further configured such that as the longitudinal relative velocity of the preceding object with respect to the host vehicle is smaller in a direction of the preceding object approaching the host vehicle along the longitudinal direction of the host vehicle and as an absolute value of the transverse relative velocity of the preceding object with respect to the host vehicle is larger in the widthwise direction of the host vehicle, then the traveling scene determining section determines that the current traveling scene is more likely a vehicle lane-change scene in which the host vehicle or another vehicle is changing lanes.

3. The obstacle verification system as recited in claim 1, wherein the traveling scene determining section is further configured such that as the longitudinal relative velocity of the preceding object with respect to the host vehicle is larger in a direction of the preceding object approaching the host vehicle along the longitudinal direction of the host vehicle, then the traveling scene determining section determines that the current traveling scene is more likely an emergency scene requiring the host vehicle to perform an emergency avoidance measure.

4. The obstacle verification system as recited in claim 1, wherein the preliminary obstacle verifying section is further configured such that one of the verification methods is a high accuracy method that involves predicting a host vehicle path based on the running state of the host vehicle detected by the vehicle running state detecting section and preliminarily determining if the preceding object will become an obstacle by comparing the host vehicle path that was predicted to a position of the preceding object detected by the object detecting section.

5. The obstacle verification system as recited in claim 4, wherein the precision determining section is further configured to determine the degree of precision of the verification result obtained with the high accuracy method based on a detected lateral width of the preceding object.

6. The obstacle verification system as recited in claim 1, wherein the preliminary obstacle verifying section is further configured such that one of the verification methods is a medium accuracy method that involves predicting a host vehicle path based on the running state of the host vehicle detected by the vehicle running state detecting section and preliminarily determining if the preceding object will become an obstacle by comparing the host vehicle path that was predicted to a hypothetical object position where the preceding object detected by the object detecting section can be assumed to be located after moving for a prescribed amount of time along a currently detected object path.

7. The obstacle verification system as recited in claim 6, wherein the precision determining section is further configured to lower the degree of precision of the verification result obtained with the medium accuracy method as a distance between the host vehicle and the preceding object increases.

8. The obstacle verification system as recited in claim 6, wherein the precision determining section is further configured to lower the degree of precision of the verification result obtained with the medium accuracy method as a temporal spacing between the host vehicle and the preceding object increases.

9. The obstacle verification system as recited in claim 6, further comprising:

a road component verifying section further configured to determine if the preceding object is a part of the road infrastructure, the precision determining section being further configured to lower the degree of precision of the verification result obtained with the medium accuracy method when the preceding object is determined to be a road structure by the road component verifying section.

10. The obstacle verification system as recited in claim 6, wherein the preliminary obstacle verifying section is further configured to assume that the temporal spacing between the host vehicle and the preceding object is the prescribed amount of time.

11. The obstacle verification system as recited in claim 1, wherein the preliminary obstacle verifying section is further configured such that one of the verification methods is a high response method that involves preliminarily determining if the preceding object will become an obstacle based on a relative movement direction of the preceding object with respect to the host vehicle and a prescribed time value in which a movement direction of the preceding object is assumed to remain unchanged.

12. The obstacle verification system as recited in claim 1, wherein the traveling scene determining section is further configured to determine a matching degree of each of a plurality prescribed traveling scenes with the current traveling scene based on the preceding object by the object detecting section and the running state of the host vehicle detected by the vehicle running state detecting section.

13. A vehicle equipped with the obstacle verification system according to claim 1.

14. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the traveling scene determining section being further configured such that as a longitudinal relative velocity of the preceding object with respect to the host vehicle is smaller in a direction of the preceding object approaching the host vehicle along a longitudinal direction of the host vehicle and as an absolute value of a transverse relative velocity of the preceding object with respect to the host vehicle is smaller in a widthwise direction of the host vehicle, then the traveling scene determining section determines that the current traveling scene is more likely a following scene in which the host vehicle is following a preceding vehicle.

15. An obstacle verification system comprising:
an object detecting section configured to detect a preceding object existing in front of a host vehicle;
a vehicle running state detecting section configured to output a running state detection result indicative of a vehicle running state;
a traveling scene determining section configured to determine a current traveling scene based on the preceding object detected by the object detecting section and the running state of the host vehicle detected by the vehicle running state detecting section;
a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;
a precision determining section configured to determine a degree of precision regarding each of the preliminary determinations obtained by the preliminary obstacle verifying section using the verification methods; and
a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations,
the preliminary obstacle verifying section being further configured such that one of the verification methods is a medium accuracy method that involves predicting a host vehicle path based on the running state of the host vehicle detected by the vehicle running state detecting section and preliminarily determining if the preceding object will become an obstacle by comparing the host vehicle path that was predicted to a hypothetical object position where the preceding object detected by the object detecting section can be assumed to be located after moving for a prescribed amount of time along a currently detected object path, and
the precision determining section being further configured to raise the degree of precision of the verification result obtained with the medium accuracy method as a detected speed of the host vehicle detected by the vehicle running state detecting section increases.

16. An obstacle verification system comprising:
an object detecting section configured to detect a preceding object existing in front of a host vehicle;
a vehicle running state detecting section configured to output a running state detection result indicative of a vehicle running state;
a traveling scene determining section configured to determine a current traveling scene based on the preceding object detected by the object detecting section and the running state of the host vehicle detected by the vehicle running state detecting section;
a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;
a precision determining section configured to determine a degree of precision regarding each of the preliminary determinations obtained by the preliminary obstacle verifying section using the verification methods; and
a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations,
the preliminary obstacle verifying section being further configured such that one of the verification methods is a high accuracy method that involves predicting a host vehicle path based on the running state of the host vehicle detected by the vehicle running state detecting section and preliminarily determining if the preceding object will become an obstacle by comparing the host vehicle path that was predicted to a position of the preceding object detected by the object detecting section,
the object detecting section having a detector configured to detect objects existing within a prescribed region in front of the host vehicle, and
the precision determining section being further configured to lower the degree of precision of the verification result obtained with the high accuracy method as the preceding object approaches an edge of the prescribed region in front of the host vehicle.

17. An obstacle verification system comprising:
an object detecting section configured to detect a preceding object existing in front of a host vehicle;
a vehicle running state detecting section configured to output a running state detection result indicative of a vehicle running state;
a traveling scene determining section configured to determine a current traveling scene based on the preceding object detected by the object detecting section and the running state of the host vehicle detected by the vehicle running state detecting section;
a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;
a precision determining section configured to determine a degree of precision regarding each of the preliminary determinations obtained by the preliminary obstacle verifying section using the verification methods; and
a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the preliminary obstacle verifying section being further configured such that one of the verification methods is a high response method that involves preliminarily determining if the preceding object will become an obstacle based on a relative movement direction of the preceding object with respect to the host vehicle and a prescribed time value in which a movement direction of the preceding object is assumed to remain unchanged, the object detecting section being configured to detect objects existing within a prescribed region in front of the host vehicle, and the precision determining section being further configured to raise the degree of precision of the verification result obtained with the high response method as the preceding object approaches the front of the host vehicle.

18. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the preliminary obstacle verifying section being further configured such that one of the verification methods is a high response method that involves preliminarily determining if the preceding object will become an obstacle based on a relative movement direction of the preceding object with respect to the host vehicle and a prescribed time value in which a movement direction of the preceding object is assumed to remain unchanged, and the precision determining section being further configured to lower the degree of precision of the verification result obtained with the high response method when the preceding object is determined to be a moving body.

19. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the preliminary obstacle verifying section being further configured such that one of the verification methods is a high response method that involves preliminarily determining if the preceding object will become an obstacle based on a relative movement direction of the preceding object with respect to the host vehicle and a prescribed time value in which a movement direction of the preceding object is assumed to remain unchanged, and the preliminary obstacle verifying section being further configured such that as a detected steering angular velocity of the host vehicle approaches zero, then the preliminary obstacle verifying section sets the prescribed amount of time to a longer period of time.

20. The obstacle verification system as recited in claim 19, wherein the preliminary obstacle verifying section is further configured such that as an absolute value of a detected steering angle of the host vehicle becomes larger and a detected acceleration of the host vehicle becomes larger, then the preliminary obstacle verifying section sets the prescribed amount of time to shorter period of time.

21. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the traveling scene determining section being further configured to determine a matching degree of each of at least two prescribed traveling scenes, which includes at least a following scene in which the host vehicle is following a preceding vehicle and another traveling scene other than the following scene, with the current traveling scene, the preliminary obstacle verifying section being further configured to execute as the verification method at least a high accuracy method that involves predicting a host vehicle path of the host vehicle based on the running state of the host vehicle detected by the vehicle running state detecting section and preliminarily determining if the preceding object will become an obstacle by comparing the host vehicle path to a detected position of the preceding object detected by the object detecting section, and at least one other verification method other than the high accuracy method, and the final obstacle verifying section being further configured to make the final determination as to if the preceding object will become an obstacle such that the final obstacle verifying section gives more weight to the preliminary determination obtained with the high accuracy method in making the final determination as the matching degree of the following scene determined by the traveling scene determining section becomes higher.

22. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the traveling scene determining section being further configured to determine a matching degree of each of at least two prescribed traveling scenes, which includes at least a lane-change scene in which the host vehicle in which the system is employed or another vehicle is changing lanes and another traveling scene other than the lane-change scene, the preliminary obstacle verifying section being further configured to execute as the verification method at least a medium accuracy method that involves predicting a host vehicle path of the host vehicle based on the running state of the host vehicle detected by the vehicle running state detecting section and preliminarily determining if the preceding object will become an obstacle by comparing the host vehicle path to a hypothetical position where the preceding object detected by the object detecting section will be assumed to be located after moving for a prescribed amount of time along a currently detected object path, and at least one other verification method other than the medium accuracy method, and the final obstacle verifying section being further configured to make the final determination as to if the preceding object will become an obstacle such that the final obstacle verifying section gives more weight to the preliminary determination obtained with the medium accuracy method in making the final determination as the matching degree of the lane-change scene determined by the traveling scene determining section becomes higher.

23. The obstacle verification system as recited in claim 22, wherein the preliminary obstacle verifying section is further configured to execute a high accuracy method as the at least one other verification method such that the high accuracy method involves predicting the host vehicle path based on the vehicle running state of the host vehicle detected by the vehicle running state detecting section and preliminarily determining if the preceding object will become an obstacle by comparing the host vehicle path to a detected position of the preceding object detected by the object detecting section, and the final obstacle verifying section is further configured to make the final determination as to if the preceding object will become an obstacle such that the final obstacle verifying section gives more weight to the preliminary determination obtained with the high accuracy method in making the final determination as the degree of precision of the verification result determined by the precision determining section decreases.

24. An obstacle verification system comprising:

an object detecting section configured to detect a preceding object existing in front of a host vehicle;

a vehicle running state detecting section configured to output a running state detection result indicative of a vehicle running state;

a traveling scene determining section configured to determine a current traveling scene based on the preceding object detected by the object detecting section and the running state of the host vehicle detected by the vehicle running state detecting section;

a preliminary obstacle verifying section configured to make preliminary determinations as to whether the preceding object will become an obstacle using a plurality of verification methods based on the preceding object detected by the object detecting section and the running state of the host vehicle detected by the vehicle running state detecting section;

a precision determining section configured to determine a degree of precision regarding each of the preliminary determinations obtained by the preliminary obstacle verifying section using the verification methods; and a final obstacle verifying section configured to calculate a verification result based on the preliminary determinations obtained by the preliminary obstacle verifying section using the verification methods and based on the current traveling scene determined by the traveling scene determining section, and the final obstacle verifying section being further configured to make a final determination as to whether the preceding object will become an obstacle based on the verification result and the degrees of precision determined by the precision determining section for the preliminary determinations, the traveling scene determining section being further configured to determine a matching degree of each of at least two prescribed traveling scenes, which includes at least a emergency scene in which an emergency avoidance measure of the host vehicle is necessary to avoid a collision and another traveling scene other than the emergency scene, with the current traveling scene, the preliminary obstacle verifying section being further configured to execute as the verification method at least a high response method that involves preliminarily determining if the preceding object will become an obstacle based on a relative movement direction of the preceding object with respect to the host vehicle and a prescribed time value in which a movement direction of the preceding object is assumed to remain unchanged, and at least one other verification method other than the high response method, and the final obstacle verifying section being further configured to make the final determination as to if the preceding object will become an obstacle such that the final obstacle verifying section gives more weight to the preliminary determination obtained with the high response method in making the final determination as the matching degree of the emergency scene determined by the traveling scene determining section becomes higher.

25. The obstacle verification system as recited in claim 24, wherein the preliminary obstacle verifying section is further configured to execute a high accuracy method as the at least one other verification method such that the high accuracy method involves predicting the host vehicle path based on the vehicle running state of the host vehicle detected by the vehicle running state detecting section and preliminarily determining if the preceding object will become an obstacle by comparing the host vehicle path to a detected position of the preceding object detected by the object detecting section, and the final obstacle verifying section is further configured to make the final determination as to if the preceding object will become an obstacle such that the final obstacle verifying section gives more weight to the preliminary determination obtained with the high accuracy method in making the final determination as the degree of precision of the verification result determined by the precision determining section decreases.

26. An obstacle verification system comprising:

object detection means for detecting a preceding object existing in front of a host vehicle;

vehicle running state detection means for outputting a running state detection result indicative of a vehicle running state;

traveling scene determination means for determining a current traveling scene based on both a longitudinal relative velocity of the preceding object that was detected with respect to the host vehicle in a longitudinal direction of the host vehicle and a transverse relative velocity of the preceding object that was detected with respect to the host vehicle in a widthwise direction of the host vehicle;

preliminary obstacle verification means for making a plurality of preliminary determinations as to whether the preceding object will become an obstacle using a plurality of verification methods, respectively, with each of the verification methods obtaining the preliminary determinations based on both the preceding object that was detected and the running state of the host vehicle that was detected;

precision determining means determining a degree of precision regarding each of the preliminary determinations that were obtained by the preliminary obstacle verification means using the verification methods; and final obstacle verifying verification means for calculating a verification result based on the preliminary determinations that were obtained by the preliminary obstacle verification means using the verification methods and based on the current traveling scene that was determined, and for making a final determination as to whether the preceding object will become an obstacle based on the verification result and the degrees of precision determined for the preliminary determinations.

27. An obstacle detecting method comprising:

detecting a preceding object existing in front of a host vehicle;

detecting and outputting a running state detection result indicative of a vehicle running state;

determining a current traveling scene based on both a longitudinal relative velocity of the preceding object that was detected with respect to the host vehicle in a longitudinal direction of the host vehicle and a transverse relative velocity of the preceding object that was detected with respect to the host vehicle in a widthwise direction of the host vehicle;

making a plurality of preliminary determinations as to whether the preceding object will become an obstacle using a plurality of verification methods, respectively, with each of the verification methods obtaining the preliminary determinations based on both the preceding object that was detected and the running state of the host vehicle that was detected;

determining a degree of precision regarding each of the preliminary determinations that were obtained;

calculating a verification result based on the preliminary determinations that were obtained by the preliminary obstacle verification means using the verification methods and based on the current traveling scene that was determined; and making a final determination as to whether the preceding object will become an obstacle based on the verification result and the degrees of precision determined for the preliminary determinations.

* * * * *